(12) United States Patent
McCarthy, III et al.

(10) Patent No.: US 9,772,612 B2
(45) Date of Patent: Sep. 26, 2017

(54) HOME MONITORING AND CONTROL

(71) Applicant: Echostar Technologies, LLC, Englewood, CO (US)

(72) Inventors: Bernard A. McCarthy, III, Atlanta, GA (US); Charles Y. Thomason, IV, Sandy Springs, GA (US); Henry Caughman, Cartersville, GA (US); Thomas P. Olley, Acworth, GA (US)

(73) Assignee: Echostar Technologies International Corporation, Englewood, CO (US)

( * ) Notice: Subject to any disclaimer, the term of this patent is extended or adjusted under 35 U.S.C. 154(b) by 0 days.

(21) Appl. No.: 14/567,765

(22) Filed: Dec. 11, 2014

(65) Prior Publication Data
US 2015/0160636 A1 Jun. 11, 2015

Related U.S. Application Data

(60) Provisional application No. 61/914,881, filed on Dec. 11, 2013, provisional application No. 61/914,856, filed on Dec. 11, 2013.

(51) Int. Cl.
*G08B 23/00* (2006.01)
*G05B 15/02* (2006.01)
(Continued)

(52) U.S. Cl.
CPC ......... *G05B 15/02* (2013.01); *G06K 9/00335* (2013.01); *G06K 9/00771* (2013.01); *G08B 19/00* (2013.01); *G08B 25/008* (2013.01); *G08B 25/08* (2013.01); *G08B 25/14* (2013.01); *H04L 12/2803* (2013.01); *H04L 12/2827* (2013.01); *H04N 5/23293* (2013.01); *H04N 5/445* (2013.01); *H04N 7/183* (2013.01);
(Continued)

(58) Field of Classification Search
CPC ............... G05B 15/02; G06K 9/00335; G06K 9/00771; G08B 13/19602; G08B 19/00; G08B 25/008; G08B 25/08; G08B 25/14; H04L 12/2803; H04L 12/2827; H04N 2005/44521; H04N 21/43615; H04N 21/44213; H04N 5/23
USPC ....................................... 340/573.1
See application file for complete search history.

(56) References Cited

U.S. PATENT DOCUMENTS 4,386,436 A    5/1983   Kocher et al.
4,581,606 A    4/1986   Mallory
(Continued)

FOREIGN PATENT DOCUMENTS

CA    2 267 988 A1    4/1998
CN    105814555 A    7/2016
(Continued)

OTHER PUBLICATIONS

U.S. Appl. No. 14/470,352, filed Aug. 27, 2014 Non Final Office Action mailed Nov. 20, 2015, 28 pages.
(Continued)

*Primary Examiner* — Naomi Small
(74) *Attorney, Agent, or Firm* — Kilpatrick Townsend & Stockton LLP

(57) ABSTRACT

Various arrangements for monitoring and control applications are presented. A television receiver may be configured to monitor sensor reading and or provide signals to control units for monitoring and home automation applications.

20 Claims, 12 Drawing Sheets

(51) Int. Cl.
*H04N 5/445* (2011.01)
*H04L 12/28* (2006.01)
*G06K 9/00* (2006.01)
*H04N 7/18* (2006.01)
*H04N 5/232* (2006.01)
*H04N 21/436* (2011.01)
*H04N 21/442* (2011.01)
*G08B 19/00* (2006.01)
*G08B 25/00* (2006.01)
*G08B 25/08* (2006.01)
*G08B 25/14* (2006.01)
*G08B 13/196* (2006.01)

(52) U.S. Cl.
CPC . *H04N 21/43615* (2013.01); *H04N 21/44213* (2013.01); *G05B 2219/2642* (2013.01); *G08B 13/19602* (2013.01); *H04N 2005/44521* (2013.01)

(56) References Cited

U.S. PATENT DOCUMENTS

| | | | |
|---|---|---|---|
| 4,694,607 A * | 9/1987 | Ishida | E05F 15/56 49/25 |
| 4,728,949 A | 3/1988 | Platte et al. | |
| 4,959,713 A | 9/1990 | Morotomi et al. | |
| 5,400,246 A | 3/1995 | Wilson et al. | |
| 5,770,896 A | 6/1998 | Nakajima | |
| 5,805,442 A | 9/1998 | Crater et al. | |
| 5,822,012 A | 10/1998 | Jeon et al. | |
| 5,894,331 A | 4/1999 | Yang | |
| 5,926,090 A | 7/1999 | Taylor et al. | |
| 5,970,030 A | 10/1999 | Dimitri et al. | |
| 6,081,758 A | 6/2000 | Parvulescu | |
| 6,104,334 A | 8/2000 | Allport | |
| 6,107,918 A | 8/2000 | Klein et al. | |
| 6,107,935 A | 8/2000 | Comerford et al. | |
| 6,119,088 A | 9/2000 | Ciluffo | |
| 6,182,094 B1 | 1/2001 | Humpleman et al. | |
| 6,330,621 B1 | 12/2001 | Bakke et al. | |
| 6,337,899 B1 | 1/2002 | Alcendor et al. | |
| 6,377,858 B1 | 4/2002 | Koeppe | |
| 6,405,284 B1 | 6/2002 | Bridge | |
| 6,415,257 B1 | 7/2002 | Junqua et al. | |
| 6,502,166 B1 | 12/2002 | Cassidy | |
| 6,529,230 B1 | 3/2003 | Chong | |
| 6,553,375 B1 | 4/2003 | Huang et al. | |
| 6,646,676 B1 | 11/2003 | DaGraca et al. | |
| 6,662,282 B2 | 12/2003 | Cochran | |
| 6,756,998 B1 | 6/2004 | Bilger | |
| 6,931,104 B1 | 8/2005 | Foster et al. | |
| 6,976,187 B2 | 12/2005 | Arnott et al. | |
| 6,989,731 B1 | 1/2006 | Kawai et al. | |
| 7,009,528 B2 | 3/2006 | Griep | |
| 7,010,332 B1 | 3/2006 | Irvin et al. | |
| 7,088,238 B2 | 8/2006 | Karaoguz et al. | |
| 7,103,545 B2 | 9/2006 | Furuta | |
| 7,143,298 B2 | 11/2006 | Wells et al. | |
| 7,234,074 B2 | 6/2007 | Cohn et al. | |
| 7,260,538 B2 | 8/2007 | Calderone et al. | |
| 7,346,917 B2 | 3/2008 | Gatto et al. | |
| 7,372,370 B2 | 5/2008 | Stults et al. | |
| 7,386,666 B1 | 6/2008 | Beauchamp et al. | |
| 7,395,369 B2 | 7/2008 | Sepez et al. | |
| 7,395,546 B1 | 7/2008 | Asmussen | |
| 7,529,677 B1 | 5/2009 | Wittenberg | |
| 7,574,494 B1 | 8/2009 | Mayernick et al. | |
| 7,590,703 B2 | 9/2009 | Cashman et al. | |
| 7,640,351 B2 | 12/2009 | Reckamp et al. | |
| 7,694,005 B2 | 4/2010 | Reckamp et al. | |
| 7,739,718 B1 | 6/2010 | Young et al. | |
| 7,861,034 B2 | 12/2010 | Yamamoto et al. | |
| 7,870,232 B2 | 1/2011 | Reckamp et al. | |
| 7,945,297 B2 | 5/2011 | Philipp | |
| 7,969,318 B2 | 6/2011 | White et al. | |
| 8,013,730 B2 | 9/2011 | Oh et al. | |
| 8,086,757 B2 | 12/2011 | Chang | |
| 8,106,768 B2 | 1/2012 | Neumann | |
| 8,156,368 B2 | 4/2012 | Chambliss et al. | |
| 8,171,148 B2 | 5/2012 | Lucas et al. | |
| 8,180,735 B2 | 5/2012 | Ansari et al. | |
| 8,201,261 B2 | 6/2012 | Barfield et al. | |
| 8,221,290 B2 | 7/2012 | Vincent et al. | |
| 8,275,143 B2 | 9/2012 | Johnson | |
| 8,289,157 B2 | 10/2012 | Patenaude et al. | |
| 8,290,545 B2 | 10/2012 | Terlizzi | |
| 8,310,335 B2 | 11/2012 | Sivakkolundhu | |
| 8,316,413 B2 | 11/2012 | Crabtree | |
| 8,320,578 B2 | 11/2012 | Kahn et al. | |
| 8,335,312 B2 | 12/2012 | Gerhardt et al. | |
| 8,413,204 B2 | 4/2013 | White et al. | |
| 8,498,572 B1 | 7/2013 | Schooley et al. | |
| 8,516,087 B2 | 8/2013 | Wilson et al. | |
| 8,550,368 B2 | 10/2013 | Butler et al. | |
| 8,619,136 B2 | 12/2013 | Howarter et al. | |
| 8,644,525 B2 | 2/2014 | Bathurst et al. | |
| 8,645,327 B2 | 2/2014 | Falkenburg et al. | |
| 8,667,529 B2 | 3/2014 | Taxier | |
| 8,750,576 B2 | 6/2014 | Huang et al. | |
| 8,780,201 B1 | 7/2014 | Scalisi et al. | |
| 8,786,698 B2 | 7/2014 | Chen et al. | |
| 8,799,413 B2 | 8/2014 | Taylor et al. | |
| 8,898,709 B2 | 11/2014 | Crabtree | |
| 8,930,700 B2 | 1/2015 | Wielopolski | |
| 8,965,170 B1 | 2/2015 | Benea et al. | |
| 9,019,111 B1 | 4/2015 | Sloo et al. | |
| 9,049,567 B2 | 6/2015 | Le Guen et al. | |
| 9,246,921 B1 | 1/2016 | Vlaminck et al. | |
| 9,462,041 B1 | 10/2016 | Hagins et al. | |
| 9,495,860 B2 | 11/2016 | Lett | |
| 9,511,259 B2 | 12/2016 | Mountain | |
| 2001/0012998 A1 | 8/2001 | Jouet et al. | |
| 2002/0003493 A1 * | 1/2002 | Durst | G01S 5/0027 342/357.55 |
| 2002/0019725 A1 | 2/2002 | Petite | |
| 2002/0063633 A1 | 5/2002 | Park | |
| 2002/0080238 A1 | 6/2002 | Ohmura | |
| 2002/0193989 A1 | 12/2002 | Geilhufe et al. | |
| 2003/0005431 A1 | 1/2003 | Shinohara | |
| 2003/0052789 A1 | 3/2003 | Colmenarez et al. | |
| 2003/0097452 A1 | 5/2003 | Kim et al. | |
| 2003/0126593 A1 | 7/2003 | Mault | |
| 2003/0133551 A1 | 7/2003 | Kahn | |
| 2003/0140352 A1 | 7/2003 | Kim | |
| 2003/0201900 A1 | 10/2003 | Bachinski et al. | |
| 2004/0019489 A1 | 1/2004 | Funk et al. | |
| 2004/0117038 A1 | 6/2004 | Karaoguz et al. | |
| 2004/0117843 A1 | 6/2004 | Karaoguz et al. | |
| 2004/0121725 A1 | 6/2004 | Matsui | |
| 2004/0128034 A1 | 7/2004 | Lenker et al. | |
| 2004/0143838 A1 | 7/2004 | Rose | |
| 2004/0148419 A1 | 7/2004 | Chen et al. | |
| 2004/0148632 A1 | 7/2004 | Park et al. | |
| 2004/0260407 A1 | 12/2004 | Wimsatt | |
| 2004/0266419 A1 | 12/2004 | Arling et al. | |
| 2005/0038875 A1 | 2/2005 | Park | |
| 2005/0049862 A1 | 3/2005 | Choi et al. | |
| 2005/0188315 A1 | 8/2005 | Campbell et al. | |
| 2005/0200478 A1 | 9/2005 | Koch et al. | |
| 2005/0245292 A1 | 11/2005 | Bennett et al. | |
| 2005/0252622 A1 * | 11/2005 | Reid | E06B 7/32 160/180 |
| 2005/0264698 A1 | 12/2005 | Eshleman | |
| 2005/0289614 A1 | 12/2005 | Baek et al. | |
| 2006/0011145 A1 * | 1/2006 | Kates | A01K 15/021 119/719 |
| 2006/0087428 A1 | 4/2006 | Wolfe et al. | |
| 2006/0136968 A1 | 6/2006 | Han et al. | |
| 2006/0143679 A1 | 6/2006 | Yamada et al. | |
| 2006/0155389 A1 | 7/2006 | Pessolano et al. | |
| 2007/0044119 A1 | 2/2007 | Sullivan et al. | |
| 2007/0078910 A1 | 4/2007 | Bopardikar | |
| 2007/0129220 A1 | 6/2007 | Bardha | |

(56) References Cited

U.S. PATENT DOCUMENTS

| | | |
|---|---|---|
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0157258 A1 | 7/2007 | Jung et al. |
| 2007/0192486 A1 | 8/2007 | Wilson et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1* | 3/2008 | Bentkovski ...... G08B 13/19695 348/50 |
| 2008/0062965 A1 | 3/2008 | Silva et al. |
| 2008/0109095 A1 | 5/2008 | Braithwaite et al. |
| 2008/0114963 A1 | 5/2008 | Cannon et al. |
| 2008/0123825 A1 | 5/2008 | Abramson et al. |
| 2008/0140736 A1 | 6/2008 | Jarno |
| 2008/0163330 A1 | 7/2008 | Sparrell |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0069038 A1 | 3/2009 | Olague et al. |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0249428 A1 | 10/2009 | White et al. |
| 2009/0271203 A1 | 10/2009 | Resch et al. |
| 2010/0031286 A1 | 2/2010 | Gupta et al. |
| 2010/0046918 A1 | 2/2010 | Takao et al. |
| 2010/0083371 A1 | 4/2010 | Bennetts et al. |
| 2010/0097225 A1 | 4/2010 | Petricoin, Jr. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0211546 A1 | 8/2010 | Grohman et al. |
| 2010/0283579 A1 | 11/2010 | Kraus et al. |
| 2010/0321151 A1 | 12/2010 | Matsuura et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1* | 6/2011 | Pu .................. A01K 5/0114 119/51.02 |
| 2011/0150432 A1 | 6/2011 | Paul et al. |
| 2011/0156862 A1 | 6/2011 | Langer |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0295396 A1 | 12/2011 | Chinen et al. |
| 2012/0019388 A1 | 1/2012 | Kates et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0094696 A1 | 4/2012 | Ahn et al. |
| 2012/0124456 A1 | 5/2012 | Perez et al. |
| 2012/0154108 A1 | 6/2012 | Sugaya |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0316876 A1 | 12/2012 | Jang et al. |
| 2012/0326835 A1 | 12/2012 | Cockrell et al. |
| 2013/0013106 A1* | 1/2013 | Carelli ................ A01K 15/021 700/237 |
| 2013/0046800 A1 | 2/2013 | Assi et al. |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0124192 A1 | 5/2013 | Lindmark et al. |
| 2013/0138757 A1 | 5/2013 | Ferron |
| 2013/0152139 A1 | 6/2013 | Davis et al. |
| 2013/0204408 A1 | 8/2013 | Thiruvengada et al. |
| 2013/0267383 A1 | 10/2013 | Watterson |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2014/0028546 A1 | 1/2014 | Jeon et al. |
| 2014/0095684 A1 | 4/2014 | Nonaka et al. |
| 2014/0101465 A1 | 4/2014 | Wang et al. |
| 2014/0142724 A1 | 5/2014 | Park et al. |
| 2014/0160360 A1 | 6/2014 | Hsu et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0215505 A1 | 7/2014 | Balasubramanian et al. |
| 2014/0218517 A1 | 8/2014 | Kim et al. |
| 2014/0223548 A1 | 8/2014 | Wassingbo |
| 2014/0266669 A1* | 9/2014 | Fadell .................. G05B 19/042 340/501 |
| 2014/0266684 A1* | 9/2014 | Poder .................. G08B 25/003 340/521 |
| 2014/0282653 A1 | 9/2014 | Ariantaj et al. |
| 2014/0310075 A1 | 10/2014 | Ricci |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0066173 A1 | 3/2015 | Ellis et al. |
| 2015/0084770 A1 | 3/2015 | Xiao et al. |
| 2015/0106866 A1 | 4/2015 | Fujita |
| 2015/0127712 A1 | 5/2015 | Fadell et al. |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemaulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0192914 A1 | 7/2015 | Slupik |
| 2015/0198941 A1 | 7/2015 | Pederson |
| 2015/0281824 A1 | 10/2015 | Nguyen et al. |
| 2015/0309487 A1 | 10/2015 | Lyman |
| 2015/0341599 A1 | 11/2015 | Carey |
| 2015/0347910 A1 | 12/2015 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0191912 A1 | 6/2016 | Lea et al. |
| 2016/0191990 A1 | 6/2016 | McCarthy |

(56) References Cited

U.S. PATENT DOCUMENTS

| | | |
|---|---|---|
| 2016/0203700 A1 | 7/2016 | Bruhn et al. |
| 2016/0234034 A1 | 8/2016 | Mahar et al. |
| 2016/0260135 A1 | 9/2016 | Zomet et al. |
| 2016/0286327 A1 | 9/2016 | Marten |
| 2016/0334811 A1 | 11/2016 | Marten |
| 2016/0335423 A1 | 11/2016 | Beals |
| 2016/0342379 A1 | 11/2016 | Keipert et al. |

FOREIGN PATENT DOCUMENTS

| | | | |
|---|---|---|---|
| EP | 2 736 027 A1 | 5/2014 | |
| EP | 3 080 677 A1 | 10/2016 | |
| EP | 3 080 710 A1 | 10/2016 | |
| GB | 2 304 952 A | 3/1997 | |
| JP | 2008148016 A | 6/2008 | |
| WO | 93/20544 A1 | 10/1993 | |
| WO | 2004/068386 A1 | 8/2004 | |
| WO | 2011/095567 A1 | 8/2011 | |
| WO | 2014/068556 A1 | 5/2014 | |
| WO | 2016/034880 A1 | 3/2016 | |
| WO | 2016/066399 A1 | 5/2016 | |
| WO | 2016/066442 A1 | 5/2016 | |
| WO | 2016/182696 A1 | 11/2016 | |

OTHER PUBLICATIONS

U.S. Appl. No. 12/700,310, filed Feb. 4, 2010 Final Office Action mailed Oct. 26, 2015, 19 pages.

Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.

Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, Issn: 1530-437X, Sections 2 and 3.

International Search Report and Written Opinion for PCT/EP2015/070286 mailed Nov. 5, 2015, all pages.

International Search Report and Written Opinion for PCT/GB2015/052544 mailed Oct. 6, 2015, all pages.

International Search Report and Written Opinion for PCT/GB2015/052457 mailed Nov. 13, 2015, all pages.

"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.

"AllJoyn Onboarding Service Frameworks," Qualcomm Connected Experiences, Inc., accessed on Jul. 15, 2014, 9 pages. Retrieved from https://www.alljoyn.org.

"App for Samsung Smart TV®," Crestron Electronics, Inc., accessed on Jul. 14, 2014, 3 pages. Retrieved from http://www.crestron.com/products/smart tv television apps/.

"Do you want to know how to find water leaks? Use a Bravedo Water Alert Flow Monitor to find out!", Bravedo.com, accessed Dec. 16, 2014, 10 pages. Retrieved from http://bravedo.com/.

"Flow Pulse®, Non-invasive clamp-on flow monitor for pipes," Pulsar Process Measurement Ltd, accessed on Dec. 16, 2014, 2 pages. Retrieved from http://www.pulsar-pm.com/product-types/flow/flow-pulse.aspx.

"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.

"International Building Code Excerpts, Updated with recent code changes that impact electromagnetic locks," Securitron, Assa Abloy, IBC/IFC 2007 Supplement and 2009, "Finally-some relief and clarification", 2 pages. Retrieved from: www.securitron.com/Other/.../New_IBC-IFC_Code_Language.pdf.

Lamonica, M., "CES 2010 Preview: Green comes in many colors," retrieved from CNET.com (http://ces.cnet.com/8301-31045_1-10420381-269.html), Dec. 22, 2009, 2 pages.

Robbins, Gordon, Deputy Chief, "Addison Fire Department Access Control Installation," 2006 International Fire Code, Section 1008.1.3.4, 4 pages.

"Ultrasonic Flow Meters," RS Hydro Ltd, accessed on Dec. 16, 2014, 3 pages. Retrieved from http://www.rshydro.co.uk/ultrasonic-flowmeter.shtml.

"Voice Activated TV using the Amulet Remote for Media Center," AmuletDevices.com, accessed on Jul. 14, 2014, 1 page. Retrieved from http://www.amuletdevices.com/index.php/Features/television.html.

Wang et al., "Mixed Sound Event Verification on Wireless Sensor Network for Home Automation," IEEE Transactions on Industrial Informatics, vol. 10, No. 1, Feb. 2014, 10 pages.

International Search Report and Written Opinion for PCT/US2014/053876 mailed Nov. 26, 2014, 8 pages.

International Search Report and Written Opinion for PCT/US2014/055441 mailed Dec. 4, 2014, 10 pages.

International Search Report and Written Opinion for PCT/EP2011/051608 mailed on May 30, 2011, 13 pages.

International Preliminary Report on Patentability for PCT/EP2011/051608 mailed Aug. 16, 2012, 8 pages.

International Search Report and Written Opinion for PCT/US2014/055476 mailed Dec. 30, 2014, 10 pages.

Mexican Institute of Industrial Property Office Action dated Nov. 1, 2013, for Mex. Patent Appln No. MX/a/2012/008882 is not translated into English, 3 pages.

U.S. Appl. No. 12/700,310, filed Feb. 4, 2010, Office Action mailed May 4, 2012, 15 pages.

U.S. Appl. No. 12/700,310, filed Feb. 4, 2010, Final Office Action mailed Oct. 10, 2012, 16 pages.

U.S. Appl. No. 12/700,310, filed Feb. 4, 2010, Non-Final Office Action mailed Apr. 1, 2013, 16 pages.

U.S. Appl. No. 12/700,310, filed Feb. 4, 2010, Non-Final Office Action mailed Oct. 15, 2013, 15 pages.

U.S. Appl. No. 12/700,310, filed Feb. 4, 2010, Final Office Action mailed Feb. 28, 2014, 17 pages.

U.S. Appl. No. 12/700,310, filed Feb. 4, 2010, Non-Final Office Action mailed Aug. 14, 2014, 18 pages.

U.S. Appl. No. 12/700,408, filed Feb. 4, 2010, Notice of Allowance mailed Jul. 28, 2012, 8 pages.

U.S. Appl. No. 13/680,934, filed Nov. 19, 2012, Non-Final Office Action mailed Oct. 2, 2013, 7 pages.

U.S. Appl. No. 13/680,934, filed Nov. 19, 2012, Final Office Action mailed Feb. 10, 2014, 13 pages.

U.S. Appl. No. 13/680,934, filed Nov. 19, 2012, Notice of Allowance mailed Apr. 30, 2014, 9 pages.

U.S. Appl. No. 13/680,934, filed Nov. 19, 2012, Notice of Allowance mailed Jul. 25, 2014, 12 pages.

International Search Report and Written Opinion for PCT/EP2015/073299 mailed Jan. 4, 2016, 12 pages.

International Search Report and Written Opinion for PCT/EP2015/073936 mailed Feb. 4, 2016, all pages.

U.S. Appl. No. 14/107,132, filed Dec. 16, 2013, Final Rejection mailed Dec. 16, 2015, 32 pages.

U.S. Appl. No. 14/485,188, filed Sep. 12, 2014, Final Rejection mailed Feb. 23, 2016, 22 pages.

U.S. Appl. No. 14/567,348, filed Dec. 11, 2014, Preinterview first office action mailed Jan. 20, 2016, 23 pages.

Mexican Institute of Industrial Property Notice of Allowance dated Feb. 10, 2014, for Mex. Patent Appln No. MX/a/2012/008882, 1 page.

U.S. Appl. No. 12/700,310, filed Feb. 4, 2010 Non-Final Office Action mailed Mar. 11, 2015, 35 pages.

U.S. Appl. No. 14/107,132, filed Dec. 16, 2013 Non Final Office Action mailed May 27, 2015, 26 pages.

U.S. Appl. No. 14/485,188, filed Sep. 12, 2014, Pre-Interview First Office Action mailed Jul. 29, 2015, 20 pages.

U.S. Appl. No. 14/485,188, filed Sep. 12, 2014, Pre-Interview First Office Action mailed Oct. 1, 2015, 10 pages.

(56) References Cited

OTHER PUBLICATIONS

U.S. Appl. No. 14/470,352, filed Aug. 27, 2014 Non Final Office Action mailed Aug. 26, 2016, all pages.
U.S. Appl. No. 14/107,132, filed Dec. 16, 2013, Non Final Office Action mailed Jul. 18, 2016, all pages.
U.S. Appl. No. 14/567,783, filed Dec. 11, 2014, Non Final Rejection mailed Aug. 23, 2016, all pages.
U.S. Appl. No. 14/715,248, filed May 18, 2015, Non-Final Rejection mailed Jul. 19, 2016, 34 pages.
International Search Report and Written Opinion for PCT/US2016/028126 mailed Jun. 3, 2016, all pages.
U.S. Appl. No. 12/700,310, filed Feb. 4, 2010 Non-Final Office Action mailed Jun. 16, 2016, 30 pages.
U.S. Appl. No. 14/528,739, filed Oct. 30, 2014 Notice of Allowance mailed Jun. 23, 2016, 34 pages.
U.S. Appl. No. 14/485,188, filed Sep. 12, 2014, Non-Final Rejection mailed Jun. 17, 2016, 29 pages.
U.S. Appl. No. 14/710,331, filed May 12, 2015, Non-Final Rejection mailed May 20, 2016, 42 pages.
International Preliminary Report on Patentability for PCT/US2014/055441 issued Jun. 14, 2016, 8 pages.
International Preliminary Report on Patentability for PCT/US2014/053876 issued Jun. 14, 2016, 7 pages.
International Preliminary Report on Patentability for PCT/US2014/055476 issued Jun. 14, 2016, 9 pages.
U.S. Appl. No. 14/567,765, filed Dec. 11, 2014, Preinterview first office action mailed Apr. 8, 2016, 30 pages.
U.S. Appl. No. 12/700,310, filed Feb. 4, 2010 Notice of Allowance mailed Nov. 8, 2016, all pages.
U.S. Appl. No. 14/584,075, filed Dec. 29, 2014, Final Rejection mailed Oct. 6, 2016, all pages.
U.S. Appl. No. 14/566,977, filed Dec. 11, 2014, Non Final Rejection mailed Oct. 3, 2016, all pages.
U.S. Appl. No. 14/567,754, filed Dec. 11, 2014, Non Final Rejection mailed Nov. 4, 2016, all pages.
U.S. Appl. No. 14/567,770, filed Dec. 11, 2014, Non Final Rejection mailed Nov. 4, 2016, all pages.
U.S. Appl. No. 14/671,299, filed Mar. 27, 2015, Non Final Rejection mailed Oct. 28, 2016, all pages.
U.S. Appl. No. 14/476,377, filed Sep. 3, 2014, Non-Final Rejection mailed Nov. 7, 2016, all pages.
Office Action for EP14868928.4 dated Sep. 23, 2016, all pages.
U.S. Appl. No. 14/470,352, filed Aug. 27, 2014 Notice of Allowance mailed Dec. 2, 2016, all pages.
U.S. Appl. No. 15/050,958, filed Feb. 23, 2016 Notice of Allowance mailed Dec. 6, 2016, all pages.
U.S. Appl. No. 15/289,395, filed Oct. 10, 2016 Non-Final Rejection mailed Dec. 2, 2016, all pages.
U.S. Appl. No. 14/107,132, filed Dec. 16, 2013, Notice of Allowance mailed Jan. 18, 2017, all pages.
U.S. Appl. No. 14/485,188, filed Sep. 12, 2014, Final Rejection mailed Nov. 25, 2016, 22 pages.
U.S. Appl. No. 14/577,717, filed Dec. 19, 2014, Final Office Action mailed Dec. 19, 2016, all pages.
U.S. Appl. No. 14/567,783, filed Dec. 11, 2014, Final Rejection mailed Dec. 20, 2016, all pages.
U.S. Appl. No. 15/075,412, filed Mar. 21, 2016, Non Final Rejection mailed Dec. 21, 2016, all pages.
U.S. Appl. No. 14/470,352, filed Aug. 27, 2014 Final Office Action mailed Mar. 17, 2016, all pages.
U.S. Appl. No. 14/577,717, filed Dec. 19, 2014, Preinterview first office action mailed Apr. 4, 2016, 29 pages.
U.S. Appl. No. 14/584,075, filed Dec. 29, 2014, Non-Final Rejection mailed Apr. 1, 2016, 40 pages.

\* cited by examiner

HOME MONITORING AND CONTROL

CROSS-REFERENCE TO RELATED APPLICATION

This application claims the benefit of U.S. Provisional Patent Application Ser. No. 61/914,881, filed 11 Dec. 2013, entitled HOME MONITORING AND CONTROL, the entirety of which is hereby incorporated by reference for all intents and purposes.

This application claims the benefit of U.S. Provisional Patent Application Ser. No. 61/914,856, filed 11 Dec. 2013, entitled METHODS AND SYSTEMS FOR HOME AUTOMATION, the entirety of which is hereby incorporated by reference for all intents and purposes.

This application is related to U.S. Nonprovisional patent application Ser. No. 14/567,754, U.S. Nonprovisional patent application Ser. No. 14/567,770, and U.S. Nonprovisional patent application Ser. No. 14/567,783, each one filed on even date herewith and entitled HOME MONITORING AND CONTROL, the entirety which is or are hereby incorporated by reference for all intents and purposes.

BACKGROUND

Control and monitoring systems for homes are typically designed for a limited and specific control or monitoring function. Such specificity though may limit system flexibility and usability. Further, such systems may be difficult to manage and configure, and also may rely on proprietary non-intuitive interfaces and/or keypads. Accordingly, users wishing to deploy different control and monitoring tasks in their home may be forced to deploy multiple systems, each designed for a specific task and each with a separate control and configuration interface. The features or aspects of the present disclosure remedy such and other issues.

SUMMARY

In an aspect, a method may include or comprise: receiving, by a television receiver incorporated within a home automation network, data from at least one component of the home automation network; analyzing, by the television receiver, the data to identify a particular condition that when met is cause for the television receiver to output a particular notification to at least one computing device for presentation thereby, to provide notice of the particular condition; and outputting, by the television receiver, the particular notification to the at least one computing device for presentation thereby in response to identification of the particular condition.

In an aspect, a television receiver incorporated within a home automation network may include or comprise at least one processor; and at least one memory element communicatively coupled with and readable by at least one processor and having stored therein processor-readable instructions that, when executed by the at least one processor, cause the at least one processor to: receive data from at least one component of the home automation network; analyze the data to identify a particular condition that when met is cause for the television receiver to output a particular notification to at least one computing device for presentation thereby, to provide notice of the particular condition; and output the particular notification to the at least one computing device for presentation thereby in response to identification of the particular condition.

In an aspect, a computer-implemented method may include or comprise receiving, by a television receiver incorporated within a home automation network, data from at least one smoke or carbon monoxide detector installed at a residence associated with the home automation network; analyzing, by the television receiver, the data to identify a particular hazardous condition that when met is cause for the television receiver to output a particular notification to at least one computing device for presentation thereby, to provide notice of the particular hazardous condition; and outputting, by the television receiver, the particular notification to the at least one computing device for presentation thereby in response to identification of the particular hazardous condition.

Many other aspects are possible.

DETAILED DESCRIPTION

Figure 1:
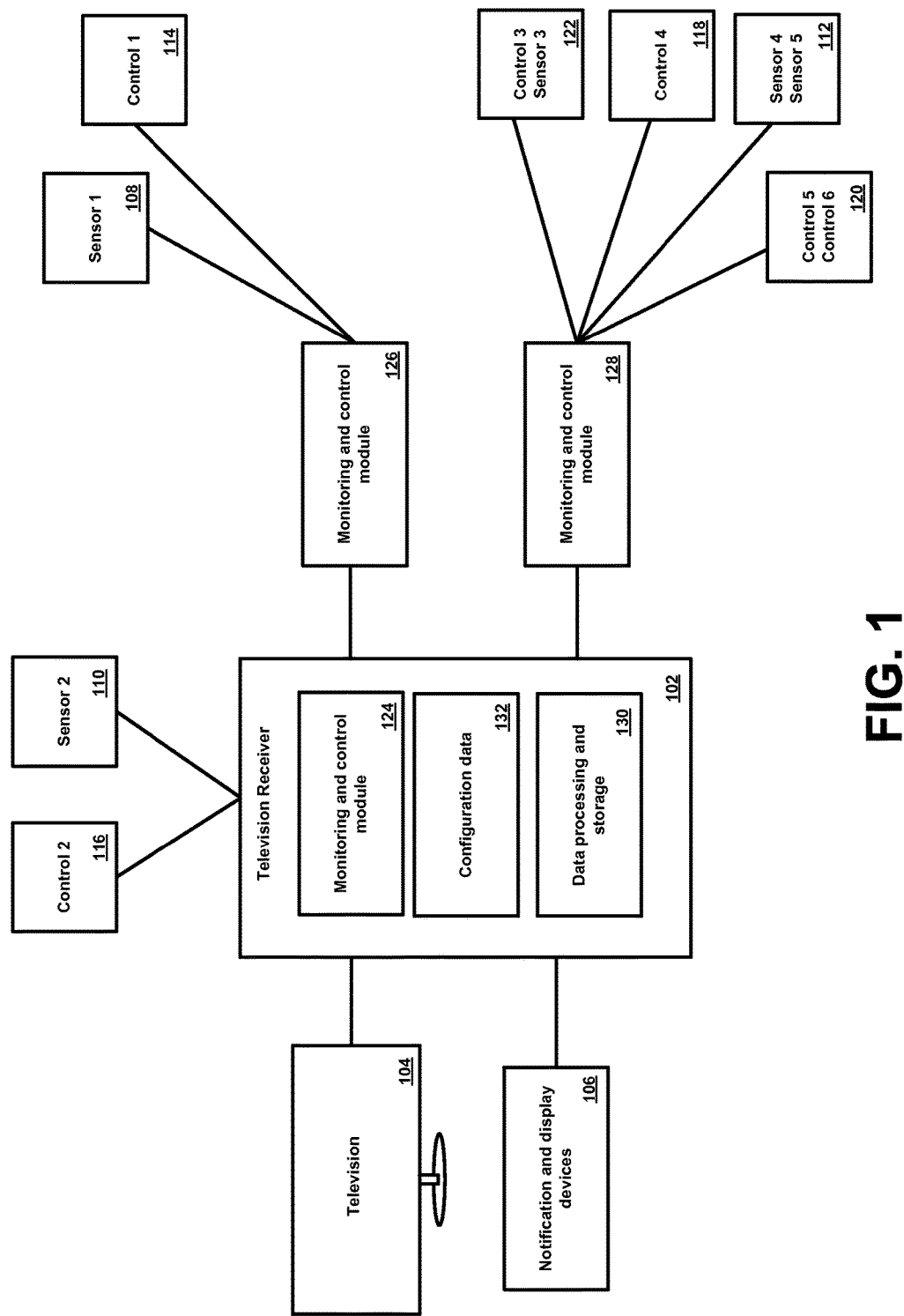
FIG. 1 shows an example home monitoring and control system.

Television receivers, such as set-top boxes, satellite-based television systems, and/or the like, are often centrally located and/or are a central feature within or in a home. Television receivers are often interconnected to remote service providers, have wired or wireless interconnectivity with mobile devices, provide a familiar interface, and are associated or connected with a large display. According to the present disclosure, television receivers may be configured to receive information from sensors, telemetry equipment, and other systems in a home or home automation environment. Capabilities of the television receivers may be utilized to analyze sensor and telemetry readings, receive user input or configurations, provide visual representations and analysis of sensor readings and the like. For example, the processing and data storage capabilities of a particular television receiver may be used to analyze and process sensor readings. The sensor readings may be stored on a data storage device of the television receiver thus providing access to historical data for subsequent analysis and interpretation as need or desired.

The television receiver may further be configured to provide an intuitive and adaptable interface and platform for deploying and configuring control and monitoring systems and/or functionality. Further, televisions and or other display devices, such as smart phones, tablets, and the like may provide a familiar and adaptable interface for users in a centrally located location of the home. Still further, sensors, controls, and the like may be used for more than one control and monitoring function. Still further, applications, monitoring functions, and control functions may be selected and configured on the television receiver to perform different types of control and monitoring tasks using one or more sensors or control devices.

In some examples, a television receiver may be configured or configurable to perform a variety of control and monitoring functions in a home. The television receiver may directly or indirectly receive sensor readings and directly or indirectly have access to control devices in the home. In some examples, the television receiver may be communicatively coupled to smoke and/or fire alarms and receive information regarding alarms, system and device or sensor status, and the like. A television or other display device associated and/or at least temporarily connected with the television receiver may be used to provide smoke alerts, escape route information, fire monitoring or status information, pet monitoring or status information, baby monitoring or status information, occupant or occupancy status information, and other information as well.

In some examples, a television receiver may be configured or configurable to receive sensor data to determine and track the presence of occupants and usage of lights, appliances, climate controls, and other devices in the home. The usage and occupancy of the home or building may be used to determine usage models and control and set usage parameters for the devices in the building. In some cases, the usage parameters may be used to simulate an occupied home by turning on/off lights and devices in the home when the occupants are away, to make it appear as if one or more of the occupants are home.

In some examples, a television receiver may be configured or configurable to receive information from sensors to determine location of objects, pets, and/or people in a building. Reading from multiple sensors may be received to determine the location of such an animate or inanimate object. A display device coupled to the television receiver may be used to display the location of the object. Sensors may be selectively activated to facilitate the detection and location of the objects and identify the location to a user. In some examples, location detection may be based on a user request to find an object or in some cases monitoring and location detection may be continuous. In an example of monitoring pets, the location of a dog may be monitored to determine well-being, movement, habits, and the like.

In some examples, a television receiver may be configured or configurable to receive information from sensors for baby monitoring applications. Reading from multiple sensors may be received to determine the location and/or the well-being of an infant. A display device coupled to the television receiver may be used to display the location of the child and/or its activity. In some examples, the system may be configured with "safe" and "unsafe" areas for the child such that when the child leaves a safe area and/or enters an unsafe area the television receiver may generate a user notification of generate at least one of audio and video for output to divert the child from the unsafe area. In some cases, safe and unsafe areas may be marked with movable position indicators. Although not so limited, an appreciation of the various features or aspects of the present disclosure may be gained in light of the following discussion in connection with the drawings.

Example System

FIG. 1 shows an example system 100 for home monitoring and control. The system 100 includes a television receiver 102 that may be directly or indirectly communicatively coupled to one or more display devices 104, such as a television or monitor. The television receiver 102 may be communicatively coupled to one or more other display and notification devices 106, examples of which include stereo systems, speakers, lights, mobile phones, tablets, and the like. Further, the television receiver 102 may be configured and/or arranged to receive readings from one or more sensors 108, 110, and/or sensor systems 112, and may be configured and/or arranged to provide signals for controlling one or more control units 114, 116, 118, and/or control systems 120. As shown in FIG. 1, a hybrid system 122 is contemplated as well.

The television receiver 102 may include a monitoring and control module 124, and may be directly connected or coupled to one or more sensors 108 and/or control units 114. Sensors and control units may be wired or wirelessly coupled to the television receiver 102. It is contemplated that the sensors and/or control units of FIG. 1 may be coupled and connected in a serial, parallel, star, hierarchical, and/or other topology and may communicate to the television receiver 102 via one or more serial, bus, or wireless protocols and technologies, examples of which may include WiFi, CAN bus, Bluetooth®, I2C bus, ZigBee®, Z-Wave, etc.

The system 100 may include one or more monitoring and control modules 126, 128 that are external to the television receiver 102. The television receiver 102 may interface to the sensors and/or control units of FIG. 1 via one or more monitoring and control modules 126, 128. The external monitoring and control modules of FIG. 1 may be wired or wirelessly coupled to the television receiver 102. In some examples, the monitoring and control modules may connect to the television receiver 102 via a communication port such as a USB port, serial port, and/or the like. In some examples, the monitoring and control modules may connect to the television receiver 102 via a wireless communication protocol such as Wi-Fi, Bluetooth®, Z-Wave, ZigBee, and the like. In some examples, the external monitoring and control modules may comprise a separate device that may be positioned near the television receiver 102, or may be in a location remote from the television receiver 102. Other examples are possible.

In some examples, the monitoring and control modules may provide protocol, communication, and interface support for each sensor and/or control unit of the system 100 of FIG. 1. In some examples, the monitoring and control modules may receive and transmit readings and provide a low-level interface for controlling and/or monitoring sensors and/or control units of FIG. 1. The readings processed by the monitoring and control modules may be used by various elements or components of the television receiver 102. For example, it is contemplated that the readings from the monitoring and control module may be logged and analyzed by a data processing and storage module 130 of the television receiver 102. The data processing and storage module 130 may analyze received data and generate control signals, schedules, and/or sequences for controlling one or more of the sensors and/or control units of the system 100 of FIG. 1. In some examples, the monitoring and control modules of FIG. 1 may be configured and/or arranged to receive and/or send digital signals and commands to the sensors and control units. In some examples, the monitoring and control modules may be configured and/or arranged to receive and/or send analog signals and commands to the sensors and/or control units of the system 100 of FIG. 1. It is contemplated that the sensors and/or control units of the system 100 may be wired or wirelessly coupled to at least one of the monitoring and control modules 126, 128. The sensors and/or control units may be coupled and connected in a serial, parallel, star, hierarchical, and/or other topology, and may communicate to the monitoring and control modules via one or more serial, bus, or wireless protocols and other technologies.

In some examples, the monitoring and control modules 124, 126, 128 may be coupled to one or more sensors. The sensors may include any number of temperate, humidity, sound, proximity, field, electromagnetic, magnetic sensors, cameras, infrared detectors, motion sensors, pressure sensors, smoke sensors, fire sensors, water sensors, and/or the like. In some examples, the monitoring and control modules 124, 126, 128 may be coupled to one or more control units. The control units may include any number of switches, solenoids, solid state devices and/or the like for making noise, turning on/off electronics, heating and cooling elements, controlling appliances, HVAC systems, lights, and/or the like. For example, a control unit may be a device that plugs in to an electrical outlet of a home. Other devices, such as an appliance, may be plugged into the device. The device may be controlled remotely to enable or disable electricity to flow to the appliance.

In some examples, sensors may be part of other devices and/or systems. For instance, one or more sensors may be part of a mobile device, such as a smartphone. The telemetry readings of such sensors may be accessed through a wireless communication interface, such as a Bluetooth connection. As another example, temperature sensors may be part of a heating and ventilation system of a home. The readings of the sensors may be accessed via a communication interface of the heating and ventilation system. In some examples, control units may be part of other devices and/or systems. A control unit may be part of an appliance, heating or cooling system, and/or other electric or electronic device. In some examples, the control units of other systems may be controlled via a communication or control interface of the system. For example, a water heater temperature setting may be configurable and/or controlled via a communication interface of the water heater or home furnace.

In some examples, sensors and/or control units may be combined into assemblies or units with multiple sensing capabilities and/or control capabilities. A single module may include, for example, a temperature sensor and humidity sensor. Another module may include a light sensor and power or control unit and so on. In some examples, sensors and control units may be configurable or adjustable. In some cases, the sensors and control units may be configurable or adjustable for specific applications. The sensors and control units may be adjustable by mechanical or manual means. In some cases, the sensors and control units may be electronically adjustable from commands or instructions sent to the sensors or control units. For example, the focal length of a camera may be configurable in some examples. The focal length of a camera may be depend on the application of the camera. In some examples, the focal length may be manually set or adjusted by a moving or rotating a lens. In some examples, the focal length may be adjusted via commands that cause an actuator to move one or more lenses to change the focal length. In other examples, sensitivity, response, position, spectrum and/or like of the sensors may be adjustable.

In practice, readings from the sensors of the system 100 may be collected, stored, and/or analyzed in or by the television receiver 102. Such analysis as well as control of the control units may be determined by configuration data 132 stored in the television receiver 102. The configuration data may define how the sensor data is collected, how often, what periods of time, what accuracy is required, and other characteristics. The configuration data may specify specific sensor and/or control unit settings for a monitoring and/or control application. The configuration data may define how the sensor readings are processed and/or analyzed. For example, for some applications, sensor analysis may include collecting sensor readings and performing time-based analysis or correlation to determine one or more trends. For other applications, sensor analysis may include monitoring sensor readings to determine if a threshold value of one or more sensor has been reached.

The function of the system may be determined by loading and/or identifying configuration data for an application. In examples, the system 100 may be configured and/or arranged for more than one monitoring or control operation by selecting or loading appropriate or particular configuration data. In some examples, the same sensors and/or control units may be used for multiple applications depending on the configuration data used to process and analyze sensor readings and/or activate the control units. Multiple monitoring and/or control applications may be active simultaneously or in a time multiplexed manner using the same or similar set of sensors and/or control units.

For example, the system 100 may be configured and/or arranged for both pet monitoring and intruder monitoring application using the same set of sensors. In examples, both monitoring applications may be active simultaneously, or in a time-multiplexed manner, depending on which configuration data is loaded. In both monitoring applications the same sensors, such as proximity sensors and/or cameras, may be used. In a pet monitoring application, data from the sensors may be gathered and recorded. The data may be analyzed to determine trends in behavior or location of the pet. Statistics may be calculated regarding the pet's activity, movement, locations, and the like. Using the same sensors, the system 100 may be configured for intruder monitoring. For intruder monitoring, the system may only monitor a specific subset of the sensors for activity, and sensor activity may not need to be saved or recorded. The sensor readings may be monitored for specific thresholds which may indicate an intruder in the home. In this example, the two different monitoring examples may be selected based on the active configuration data. When one configuration data is active, data from the sensors may be saved and analyzed for pet monitoring. When the second configuration data is active, the system may monitor sensor readings for specific thresholds.

In examples, results, status, analysis, and configuration data details for each application may communicated to a user or a user device. In examples, at least one of auditory, visual, and tactile communication methods may be used or leveraged. In some cases, a display device such as a television may be used for display and audio purposes. The display device may show information related to the monitoring and control application. Statistics, status, configuration data, and other elements may also be shown.

In some examples, the system 100 may include additional display and notification devices 106 capable of notifying the user, showing the status, configuration data, and/or the like. The additional notification and display devices may be devices that directly or indirectly connected to the television receiver 102. In some examples, computers, mobile devices, phones, tablets, and the like may receive information, notifications, from the television receiver 102. Data related to the monitoring and control applications and activity may be transmitted to remote devices and displayed to a user.

Display devices such as televisions, laptops, smartphones, tablets, and the like may be used for presenting to the user one or more interfaces that may be used to further configure or change configuration data for each application. An interface may include one or more options, selection tools, navigation tools for modifying the configuration data which in turn may change monitoring and/or control activity of an application. Modification to a configuration may be used to adjust general parameters of a monitoring application to specific constraints or characteristics of a home, user's schedule, control units, and/or the like.

Display interfaces may be used to select and/or download new configurations for monitoring and/or control applications. A catalog of pre-defined configuration data definitions for monitoring and control applications may be available to a user. A user may select, load, and/or install the applications on the television receiver 102 by making a selection using in part the display device. For example, in the case of pet monitoring applications, a catalog of pre-defined configuration data definitions may include applications for general pet monitoring and specific configurations based on the size of the pet, type of pet, specific monitoring functions, and/or the like. Configuration data for monitoring a cat may be different than the configuration data for monitoring a dog, for example. A cat monitoring application, may for example, require higher sensor sensitivity to account for its small size and/or infrequent movements, while a dog monitoring application may benefit from more frequent sensor reading sampling to account for the dog's more frequent movement.

In examples, the configuration data 132 may be a separate executable application, code, package, and/or the like. In some cases, the configuration data may be a set of parameters that define computations, schedules, options, for other processor executable code or instructions. Configuration data may be a meta data, text data, binary file, and/or the like. In examples, notification and display devices may be configured to receive periodic, scheduled, or continuous updates for one or more monitoring and control applications. The notifications may be configured to generate pop-up screens, notification banners, sounds, and/or other visual, auditory, and/or tactile alerts. In the case where the display device is a television, some notifications may be configured to cause a pop-up or banner to appear over the programming or content being displayed. Some notifications may be configured to cause the television to turn on if it is powered off or in stand-by mode and display relevant information for a user.

Figure 2:
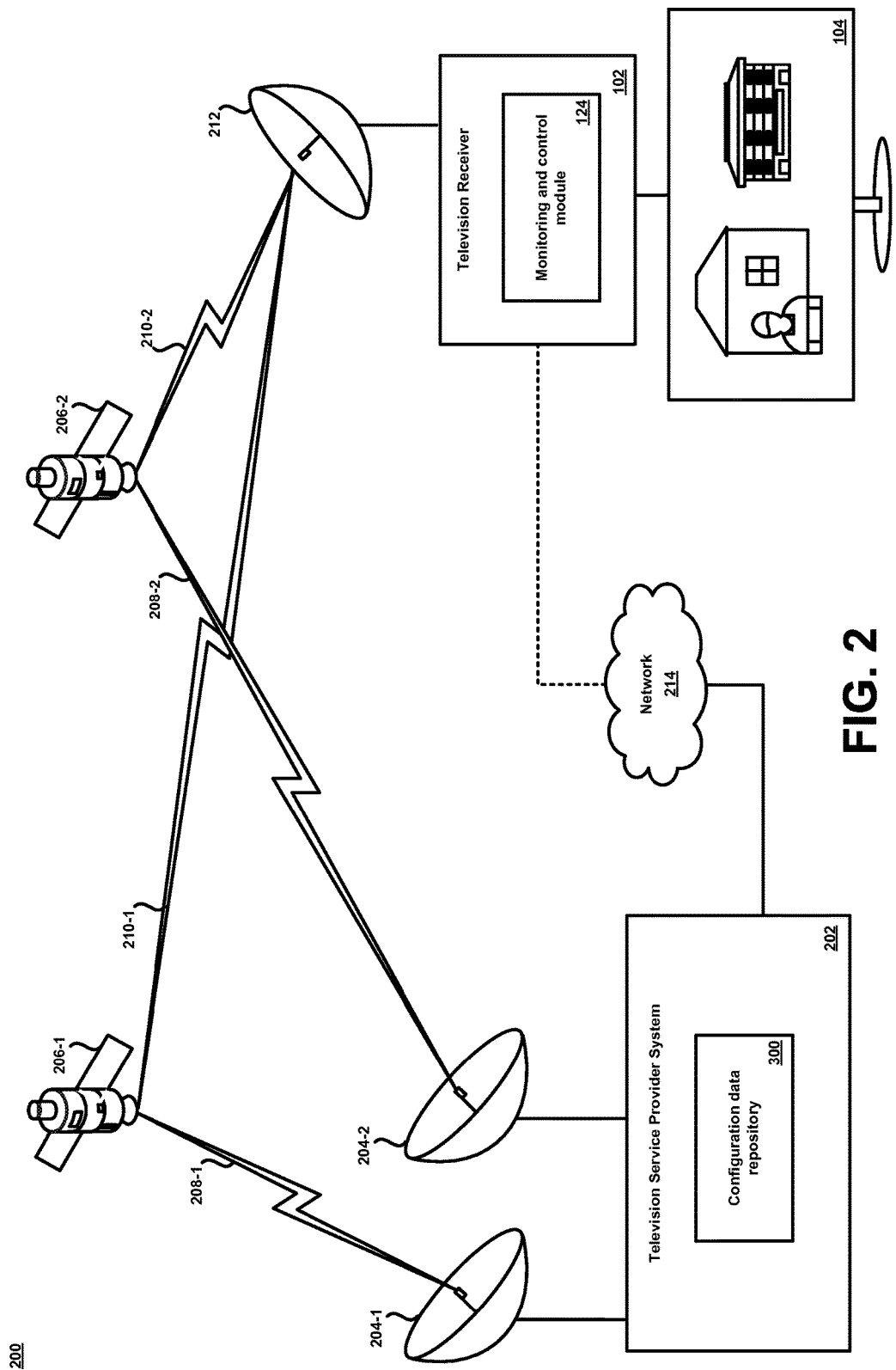
FIG. 2 shows an example satellite television distribution system.

The monitoring and control system may include television receivers for a satellite based television system 200, an example of which is illustrated in FIG. 2. The satellite television distribution system 200 may include, in addition to the television receiver 102 and display device 104 of FIG. 1, but is not limited to: television service provider system 202, satellite transmitter equipment 204, satellites 206, satellite dish 212. Alternate examples of the satellite television distribution system 200 may include fewer or greater numbers of components. While only a single instance of the satellite dish 212, television receiver 102, and display device 104 (collectively referred to as "user equipment") are shown in FIG. 2, multiple (e.g., tens, thousands, millions) instances of user equipment may receive television signals from the television service provider system 202 via satellites 206.

The television service provider system 202 and satellite transmitter equipment 204 may be operated by a television service provider. A television service provider may distribute television channels, on-demand programming, programming information, and/or other content/services to users. In some examples, the television service provider system 202 may distribute or provide a gateway or library for configuration data for various monitoring and control applications. The television service provider system 202 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams.

The satellite transmitter equipment 204 may be used to transmit a feed of one or more television channels from the television service provider system 202 to one or more satellites 206. While a single instance of the television service provider system 202 and the satellite transmitter equipment 204 are illustrated as part of the satellite television distribution system 200, it should be understood that multiple instances of transmitter equipment may be used, possibly scattered geographically, to communicate with satellites 206. Such multiple instances of satellite transmitting equipment may communicate with the same or with different satellites. Different television channels may be transmitted to the satellites 206 from different instances of transmitting equipment. For instance, a different satellite dish of the satellite transmitter equipment 204 may be used for communication with satellites in different orbital slots.

The television service provider system 202 may receive configuration data for one or more monitoring and control applications from various sources. To distribute configuration data to receivers, the data may be relayed to user equipment via multiple television distribution satellites. Each satellite may relay multiple transponder streams. Satellite transmitter equipment 204 may be used to transmit a feed of one or more configuration data from television service provider system 202 to one or more satellites 206.

The satellites 206 may be configured to receive signals, such as streams of television channels, from one or more satellite uplinks such as the satellite transmitter equipment 204. The satellites 206 may relay received signals from satellite transmitter equipment 204 (and/or other satellite transmitter equipment) to multiple instances of user equipment via transponder streams. Different frequencies may be used for uplink signals 208 and transponder streams 210. Satellites 206 may be in geosynchronous orbit. Each of the transponder streams transmitted by satellites 206 may contain multiple television channels and/or configuration data transmitted as packetized data. For example, a single transponder stream may be a serial digital packet stream containing multiple television channels. Therefore, packets for multiple television channels may be interspersed. In examples a stream of a television channel may be referred to as a programming stream. In some cases several television channels may be combined into one stream such as in a transponder stream. In this descriptions transponder streams and programming streams may be used synonymously.

Multiple satellites 206 may be used to relay television channels from the television service provider system 202 to the satellite dish 212. Different television channels may be carried using different satellites. Different television channels and/or configuration data may also be carried using different transponders of the same satellite. As an example, a first and second television channel may be relayed via a first transponder of the satellite 206-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

The satellite dish 212 may be a piece of user equipment that is used to receive transponder streams from one or more satellites, such as satellites 206. The satellite dish 212 may be provided to a subscriber for use on a subscription basis to receive television channels provided by the television service provider system 202, satellite transmitter equipment 204, and/or satellites 206. The satellite dish 212, which may include one or more low noise blocks (LNB), may be configured to receive transponder streams from multiple satellites and/or multiple transponders of the same satellite. The satellite dish 212 may be configured to receive television channels via transponder streams on multiple frequencies. Based on the characteristics of the television receiver 102 and/or the satellite dish 212, it may only be possible to capture transponder streams from a limited number of transponders concurrently. For example, a tuner of television receiver 102 may only be able to tune to a single transponder stream from a transponder of a single satellite at a given time. The tuner can then be re-tuned to another transponder of the same or a different satellite. A television receiver having multiple tuners may allow for multiple transponder streams to be received at the same time.

In communication with satellite dish 212 may be one or more television receivers. Television receivers may be configured to decode signals received from satellites 206 via the satellite dish 212 for output and presentation via a display device, such as the display device 104. The television receiver 102 may be incorporated as part of a television or may be part of a separate device, commonly referred to as a set-top box (STB). The television receiver 102 may decode signals received via satellite dish 212 and provide an output to display device 104.

Figure 3:
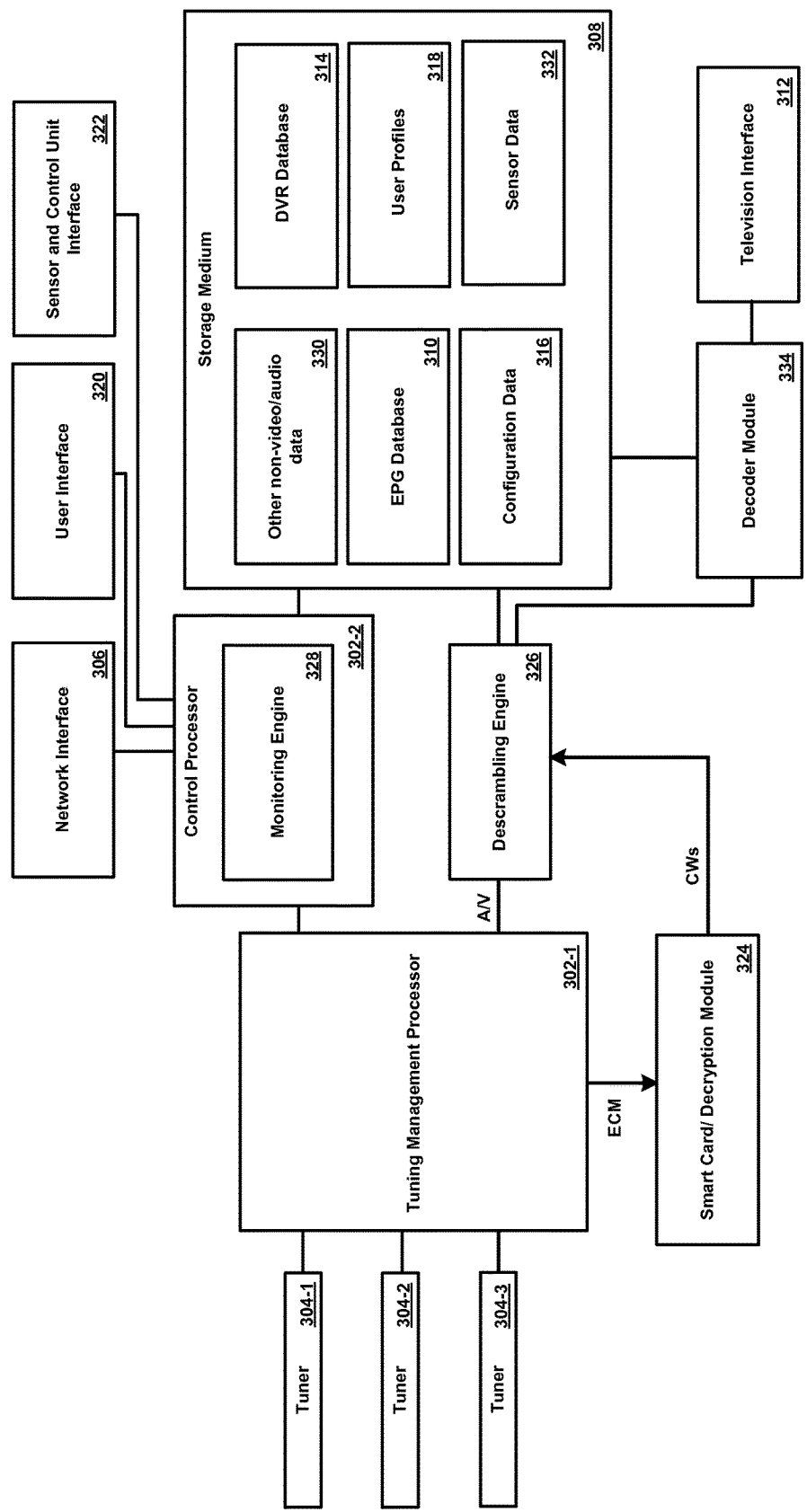
FIG. 3 shows an example television receiver.

Referring now additionally to FIG. 3, further detail of various examples of a television receiver. A television receiver is defined to include set-top boxes and also circuitry having similar functionality that may be incorporated with another device. For instance, circuitry similar to that of a television receiver may be incorporated as part of a television. As such, while FIG. 3 illustrates an example of the television receiver 102 as separate from the display device 104, it should be understood that, in other examples, similar functions may be performed by a television receiver integrated with the display device 104.

The display device 104 may be used to present video and/or audio decoded and output by the television receiver 102. The television receiver 102 may also output a display of one or more interfaces to the display device 104, such as an electronic programming guide (EPG). The television receiver 102 may output to the display device 104 one or more interfaces for monitoring, configuring, or controlling monitoring and control applications. In many examples, the display device 104 is a television. The display device 104 may take many different forms though, such as a monitor, computer, handheld device, or some other device configured and/or arranged to display video and, possibly, play audio.

The uplink signal 208-1 represents a signal between the satellite transmitter equipment 204 and satellite 206-1. The uplink signal 208-2 represents a signal between the satellite transmitter equipment 204 and the satellite 206-2. Each of the uplink signals 208 may contain streams of one or more different television channels. For example, the uplink signal 208-1 may contain a first group of television channels, while the uplink signal 208-2 may contain a second group of television channels. Each of these television channels may be scrambled or encrypted such that unauthorized persons are prevented from accessing the television channels.

The transponder stream 210-1 represents a transponder stream signal between the satellite 206-1 and the satellite dish 212. The transponder stream 210-2 represents a transponder stream signal between the satellite 206-2 and the satellite dish 212. Each of the transponder streams 210 may contain one or more different television channels and/or information related to configuration data, which may be at least partially scrambled. For example, the transponder stream 210-1 may be a first transponder stream containing a first group of television channels, while the transponder stream 210-2 may be a second transponder stream containing a different group of television channels. When a television channel is received as part of a transponder stream and is decoded and output to the display device 104 (rather than first storing the television channel to a storage medium as part of DVR functionality then later outputting the television channel from the storage medium), the television channel may be considered to be viewed "live."

The network 214 may serve as a secondary communication channel between the television service provider system 202 and the television receiver 102. However, in many instances, the television receiver 102 may be disconnected from the network 214 (for reasons such as because the television receiver 102 is not configured to connect to the network 214 or a subscriber does not desire or cannot connect to the network 214). As such, the connection between the network 214 and the television receiver 102 is represented by a dotted line. Via such a secondary communication channel, bidirectional exchange of data may occur. As such, data may be transmitted to the television service provider system 202 from the television receiver 102 via network 214. Data may also be transmitted from the television service provider system 202 to the television receiver 102 via the network 214. The network 214 may be the Internet. While audio and video services may be provided to the television receiver 102 via satellites 206, feedback from the television receiver 102 to the television service provider system 202 may be transmitted via the network 214.

The television receiver of FIG. 3 may be configured for monitoring and control applications. The television receiver 102 may be in the form of a separate device configured to be connected with a display device, such as a television. The television receiver 102 may be in the form of an STB that outputs video and/or audio to a display device, such as a television. The television receiver 102 may be incorporated as part of a television, such as the display device 104 of FIG. 1. The television receiver 102 may include: processors 302 (which may include tuning management processor 302-1 and control processor 302-2, and possibly additional processors), tuners 304, network interface 306, computer-readable storage medium 308, electronic programming guide (EPG) database 310, television interface 312, digital video recorder (DVR) database 314 (which may include provider-managed television programming storage and/or user-defined television programming), configuration data 316, user profiles 318, user interface 320, sensor and control unit interface 322, smartcard 324, and/or descrambling engine 326. In other examples, the television receiver 102 may include fewer or greater numbers of components, some of which may or may not be implementation-specific. It should be understood that the various components of the television receiver 102 may be implemented using hardware, firmware, software, and/or some combination thereof. Functionality of components may be combined; for example, functions of descrambling engine 326 may be performed by the processor 302-1. Further, functionality of components may be spread among additional components.

The processors 302 may include one or more specialized and/or general-purpose processors configured to perform processes such as tuning to a particular channel, accessing and displaying EPG information from the EPG database 310, analyzing sensor data, and/or receiving and processing input from a user. For example, the processor 302-1 may include one or more processors dedicated to analyzing sensor data for a monitoring and control application. The processor 302-1 may analyze sensor data and generate a summary report for output and display on a television. The processor 302-1 may include a monitoring and control engine 328.

The tuners 304 may include one or more tuners used to tune to transponders that include broadcasts of one or more programming streams or television channels. In the illustrated example of the television receiver 102, three tuners are present (tuner 304-1, tuner 304-2, and tuner 304-3). In other examples, two or more than three tuners may be present, such as four, six, or eight tuners. Each tuner contained in tuners 304 may be capable of receiving and processing a single transponder stream from a satellite transponder at a given time. As such, a single tuner may tune to a single transponder stream at a given time. If tuners 304 include multiple tuners, one tuner may be used to tune to a television channel on a first transponder stream for display using a television, while another tuner may be used to download configuration data or updates for a monitoring and/or control application from a second transponder.

The network interface 306 may be used to communicate via an alternate communication channel with a television service provider, if such communication channel is available. The primary communication channel may be via satellite (which may be unidirectional to the television receiver 102) and the alternate communication channel (which may be bidirectional) may be via a network, such as the Internet. Referring back to FIG. 2, the television receiver 102 may be able to communicate with the television service provider system 202 via a network, such as the Internet. This communication may be bidirectional: data may be transmitted from the television receiver 102 to the television service provider system 202 and from the television service provider system 202 to the television receiver 102. Referring back to FIG. 3, the network interface 306 may be configured to communicate via one or more networks, such as the Internet, to communicate with the television service provider system 202 of FIG. 2. Information may be transmitted and/or received via the network interface 306. For instance, instructions (e.g., regarding subscription portability) from a television service provider may also be received via the network interface 306, if connected with the Internet. The network interface 306 may be used to provide a confirmation to a television service provider that instructions received from the television service provider have indeed been executed.

The storage medium 308 may represent one or more non-transitory computer-readable storage mediums. The storage medium 308 may include memory and/or a hard drive. The storage medium 308 may be used to store information received from one or more satellites and/or information received via the network interface 306. The storage medium 308 may store information related to the EPG database 310, other non-video/audio data 330, DVR database 314, user profiles 318, sensor data 332, and/or configuration data 316. Recorded television programs may be stored using the storage medium 308, as part of the DVR database 314. The storage medium 308 may be partitioned or otherwise divided (such as into folders). The configuration data 316 may include a library of available configuration data that may be downloaded from a service provider.

The sensor data 332 may store information related sensor readings, control history, audio and video recorded from audio and video sensors and/or the like. The sensor data 332 may be used to keep a history of control unit commands or actions performed by the system. A history of automated home light on/off actions may be maintained in the sensor data 332. Information from the sensor data 332 may be used to inform users and provide the user with a visual interface displayed by a television that allows a user to browse and review the sensor and control data. Sensor data may be sensor data directly received via the sensor and control unit interface 322. Sensor data may also be sensor data that has been filtered, analyzed, and/or processed by one or more of the processors 302.

The user profiles 318 may include stored user preferences. For example, a user may specify a preferred category of television programming, such as: sports, news, movies, sitcoms, reality, etc. The user may also specify whether they prefer broadcast ("live") television, on-demand programming, or recorded television programming (via user or provider defined timers). User profiles may include preferences for monitoring and control functions. Some users may prefer a specific configuration data to be used for monitoring and/or control applications. Depending on the time of day, home occupancy, different users may be present in a home and may have different monitoring and/or control needs. In some examples, data for a user's profile may be defined based on measured occupancy, movement, actions, manually set profiles, and/or the like. In some examples, a user may be permitted to select which user profile of user profiles 318 is active.

The decoder module 334 may serve to convert encoded video and audio into a format suitable for output to a display device. For instance, the decoder module 334 may receive MPEG video and audio from the storage medium 308 or the descrambling engine 326 to be output to a television. The decoder module 334 may convert the MPEG video and audio into a format appropriate to be displayed by a television or other form of display device and audio into a format appropriate to be output from speakers, respectively. In some examples, the decoder module 334 may be used to convert video and/or audio that is captured from sensors.

Digital Video Recorder (DVR) functionality may permit a television channel to be recorded for a period of time. DVR functionality of the television receiver 102 may be managed by the control processor 302-1. The control processor 302-1 may coordinate the television channel, start time, and stop time of when recording of a television channel is to occur. Digital Video Recorder functionality may permit a video and/or audio from sensors such as cameras to be recorded for a period of time. The DVR database 314 may store timers that are used by the control processor 302-1 to determine when video and/or audio from a sensor should be recorded. In some examples, a limited amount of the storage medium 308 may be devoted to the DVR database 314. Timers may be set by the television service provider and/or one or more users of television receiver.

The user interface 320 may include a remote control (physically separate from television receiver 102) and/or one or more buttons on the television receiver that allow a user to interact with the television receiver 102. The user interface 320 may be used define configuration data, review sensor settings, receive alerts, and/or the like. In examples, cryptographic functions, smart cards, and data scrambling and descrambling functionality of the television receiver may be configured to provide data security to stored sensor readings.

Referring back to the tuners 304, television channels received via satellite (or cable) may contain at least some scrambled data. Packets of audio and video may be scrambled to prevent unauthorized users (e.g., nonsubscribers) from receiving television programming without paying the television service provider. The descrambling engine 326 may use control words output by the smartcard 324 in order to descramble video and/or audio corresponding to television channels for storage and/or presentation. In examples, data, video, and video captured from sensors may be scrambled and/or encrypted using a control word and/or functions of the smart card and the descrambling engine.

For simplicity, the television receiver 102 of FIG. 3 has been reduced to a block diagram; commonly known parts, such as a power supply, have been omitted. Further, some routing between the various modules of television receiver has been illustrated. Such illustrations are for exemplary purposes only. The state of two modules not being directly or indirectly connected does not indicate the modules cannot communicate. Rather, connections between modules of the television receiver are intended only to indicate possible common data routing. It should be understood that the modules of television receiver may be combined into a fewer number of modules or divided into a greater number of modules. Further, the components of the television receiver 102 may be part of another device, such as built into a television. The television receiver 102 may include one or more instances of various computerized components, such as disclosed in relation to computer system 1200 of FIG. 12.

The television receiver 102 may be configured to be part of a monitoring and control system depicted in FIG. 1, and may be adapted to or for monitoring and control applications such as smoke/fire detection, pet and object monitoring, and the like.

Fire Monitoring

In some examples, the television receiver 102 may be directly or indirectly coupled to smoke, fire, heat, and other sensors and systems of a home. The television receiver 102 may connect to each sensor or alarm of a home fire alarm system and receive information and data regarding the status of the system, sensor readings, status of sensors, and the like. The smoke, fire, heat, and other sensors may be distributed throughout a home or located in strategic locations like near bedrooms. The television receiver 102 may monitor data received from the sensors, analyze the sensors, and provide a report or interface for configuring or analyzing the sensors. It is contemplated that such information may be presented and/or may be accessible and/or configurable on or via essentially any type of device that has a screen, such as a television, a smartphone, and etc.

In some examples, the television receiver 102 may monitor the sensors to determine if an alarm condition has been detected, such as presence of smoke, fire, high heat, gases, etc. When the alarm condition has been detected the television receiver 102 may be configured to provide indications on a display or notification device such as a television of the alarm and other status information. In examples, the indications may be configurable by the user or selected from a variety of pre-determined notification types and configurations related to the configuration data.

A television receiver positioned in a centrally located area of a home may provide a clear and direct identifications of system status, alerts, alarms, and the like, related to the fire and smoke sensors. In this example, the television receiver 102 may receive sensor status and may be configured to transmit status information to a display device such as a television connected the television receiver. The status information may include, battery levels, sensor reading levels, location, history of readings, communication signal strength, diagnostic information, recommended exit information, and/or the like. For example, one or more of the sensors may be battery powered and/or use a battery for power back up. When a battery level of the sensor is low, a status indicator may be received by the television receiver. The television receiver may transmit an indication to the display device for alerting the user of the lower battery. The interface may give a location the sensor to make the sensor easy to locate.

In some examples, the television receiver 102 may be configured to receiver sensor data, monitor the sensor data, and if necessary provide user notifications and alarms about the alarm. The user notifications may be configurable by the user. In some examples, the user notifications may generate different notifications based on an active user profile or configuration data. The alerts may be configured to provide specific evacuation or preplanned emergency plan instructions such as escape routes, locations of emergency equipment such as fire extinguishers and water sources for example. The emergency escape routes may be based on the sensor or sensors from which an alarm condition was received, the location of the receiver, and the like. For example, the television receiver may receive data from a sensor consistent with a fire condition. A map of plan of the building may be stored in the television receiver along with the location of the sensors. When the data from a sensor is received, the television receiver may determine the location or likely location of the fire condition. Based upon the sensor location, type of sensor readings, active user profile, configuration data, and/or other settings the television receiver may provide indications, alarms, or initiate mitigation actions.

In examples the user indications of an alarm may be determined based on the active user profile and the settings or configurations associated with a profile. Different indications may be provided to different users, types of users, locations, and the like. For example, different indications may be provided based on the age or classification of the active user profile. Kids, adults, elderly persons, disabled persons and the like may receive different types of notifications. Notifications for a young child, for example may be limited to alarms and/or escape instructions. When the active profile is associated with a child or young adult the notification may be configured to provide escape of emergency instructions. The emergency instructions may include a nearest exit routes that are away from the location of the sensor with the alarm condition. The notification may include a map and/or escape instructions that are displayed on a display device such as a television or a smartphone communicatively coupled to the television receiver. The escape routes may be relative to the location of the television receiver. Auditory, and other visual notification may be initiated. The auditory notifications may include audio instructions with escape routes. In some cases the audio instructions may include pre-recorded voice instructions of the child's parent or a person familiar to the child. Lights or guide markers may be activated by the system to direct the user to the escape route.

Notifications for an adult or other profiles may be configured provide additional information in addition or instead of the escape routes or emergency plan. When the active profile is associated with an adult, for example, notifications may include the type of alarm condition received, the location of the alarm condition, options for initiating mitigation actions, locations or emergency equipment and the like. The additional notifications may be configured to provide information relevant to identifying and/or investigating the alarm condition. In some cases the additional notification may be automatically displayed when the corresponding user profile is active in the television receiver. In some cases, the additional information and notifications may require an additional user action or require the user to enter a parental code prior to the notifications being displayed on the television for example.

In examples, which user active profile may be determined by the type of programming being tuned or being watched. EPG data related to the type of programming being watched, previously watched, and/or most often watched may be analyzed to determine the active profile. When programming that is being watched, or is usually watched on television receiver is normally associated or consistent with kids programming the default notifications related to fire/smoke alarms may be tailored to kids and provide simple or a subset of the notifications. In some examples, the active profile may be manually determined by the user by entering a code. In some examples, the active profile may be determined by the time of the day, receiver location, and the like. In some examples, the notifications may be transmitted to service providers, remote terminals, mobile devices, and the like, and the status of the system may be monitored from remote locations using a mobile device.

In some examples, other sensor data to diagnose the problem, provide location information and the like. For example, other sensors, whose primary purpose may be for other monitoring or control applications may be accessed and the readings analyzed when an alarm condition has been detected by the fire/smoke sensors. Readings from sensors, for example, that may be normally used to determine is a home is occupied (i.e. proximity sensors, motion sensors) may be used by the receiver to determine what types of notification to take. If a home is unoccupied, for example, the information may be used directly notify the service providers or fire department of an alert. As another example, cameras from other monitoring applications may be used to provide video or images from the area where an alarm condition was observed. In examples, fire/smoke monitoring functions and the system may be coupled with other monitoring and control systems. In some examples, the television receiver may transmit to a display device an interface for specifying options, locations of sensors, behaviors and the like. In examples, a television remote control and/or other input devices may be used to enter such information. Other examples are possible.

Figure 4:
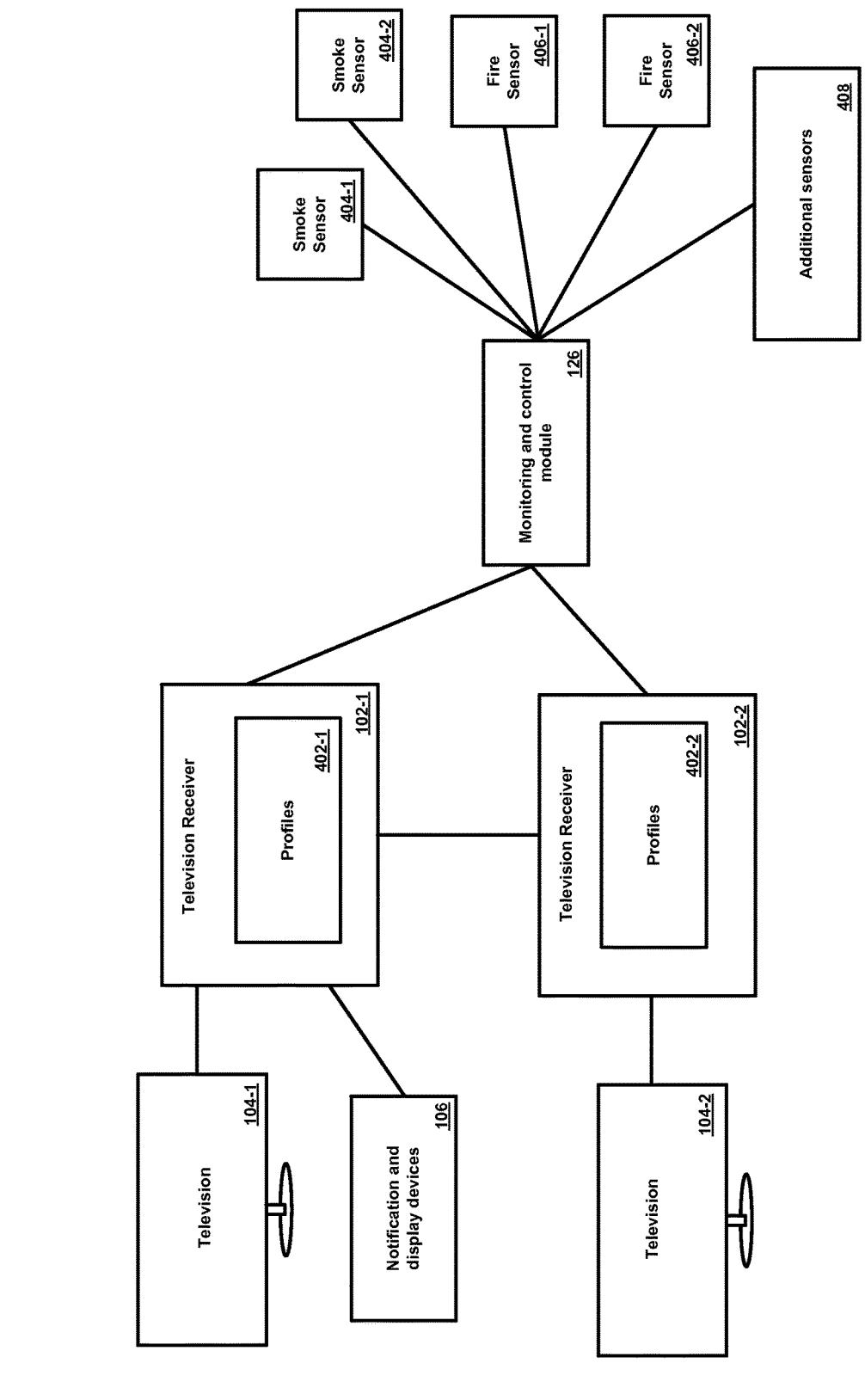
FIG. 4 shows an example system for fire and smoke monitoring.

FIG. 4 shows an example of a system 400 configured and/or arranged for fire alarm monitoring and notification using a television receiver. In this example, at least one television receiver 102 may be located in a home or residence, and may be connected to a particular display device 104, and/or at least one other notification device 106 such as noise makers, lights, lasers, and the like. In general, television receivers may be centrally located in the home or located in different parts of the home. One receiver and display device may be located in a bedroom, for example, while another is located in a living room. The location of the receivers may be marked in the configuration or settings of each receiver. Each television receiver 102 may include a set of user profiles 402. The user profiles 402 may determine the alarm notification options for each one of a plurality of users, user type, user age, user contact information, and etc.

Each television receiver 102 may receive sensor data. In some examples, the sensor data may be received via a monitoring and control module 126 that is coupled to the sensors. The sensors may include smoke sensors 404, fire sensors 406, and other sensors 408 which may be used for other monitoring and control applications and may include cameras, infrared sensors, location detection sensors, and the like. The sensors may be positioned throughout the home or in specific locations of the home as needed and/or desired.

In some examples, each television receiver 102 of FIG. 4 may receive sensor data independently from one another. Each television receiver 102 may analyze and determine alarm conditions based on the sensors data independently. In some examples, one of the television receivers may be designated as a master and receive and analyze the sensor data for alarm or incident conditions. The alarm conditions may be transmitted to other television receivers in the home from the master television receiver.

In some examples, the television receiver may receive raw sensor data such as smoke density readings, temperature readings, and the like. The raw sensor data may be analyzed to determine if the readings are consistent with an incident or alarm condition such as unusual smoke, presence of fire, and the like. In some cases the television receiver may receive alarm conditions from the sensors. The sensors may transmit status indicators specifying if an alarm condition has been sensed. When an alarm condition is determined by the television receiver the incident conditions may be determined by the television receiver. The television receiver may determine the location of the incident, the severity of the incident and the like. Based on the active user profile the television receiver may generate a user notification that may be sent to the display or notification device such as a television.

Figure 5:
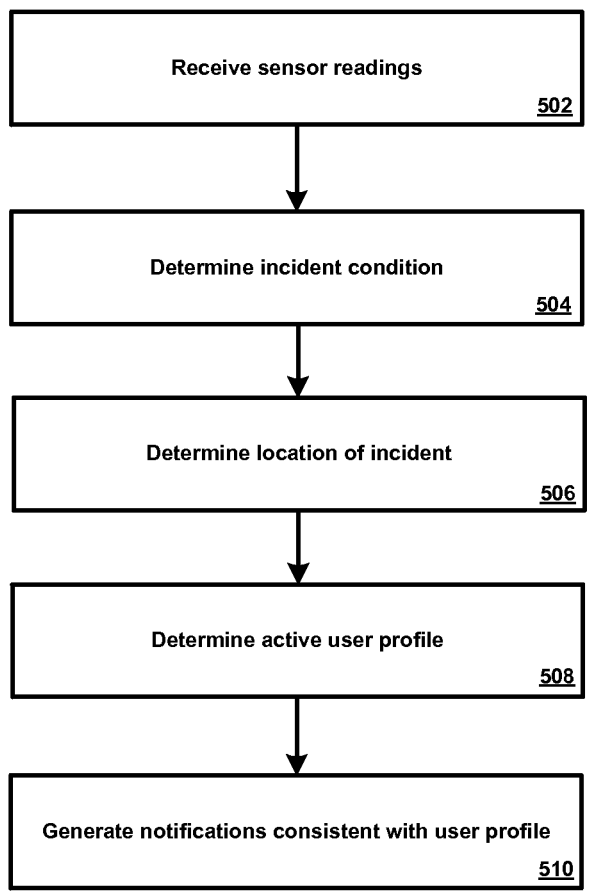
FIG. 5 shows a first example method according to the disclosure.

FIG. 5 illustrates an example of a method 500 for providing user notification of a fire alarm using a television receiver. The method 500 may be performed using one or more elements of the systems previously described. For instance, the system 100 of FIG. 1 and/or the system 400 of FIG. 4 may be used to perform or otherwise implement the method 500. Components of such systems may be implemented using hardware, software, and/or firmware. Further, one or more steps of the method 500 may be implemented by at least one of the components of a computer system or device, such as that discussed in further detail below in connection with FIG. 12.

At block 502, the television receiver may receive sensor readings and/or data from smoke sensors, IR sensors, cameras, temperature sensors, and the like. At block 504, the television receiver may analyze the sensor readings and determine or identify an incident condition such as the severity of the incident. The severity of the incident may be determined by the level of sensor readings, number of sensors reporting readings, changes in readings, and the like.

For example a quick escalation of smoke readings may signify a high severity of the incident. At block 506, the location of the incident may be determined. The location of the incident may be determined based on the known location of the sensors reporting the incident, for example.

At block 508, an active user profile may be determined. The active user profile may be determined by on historical television programming watching or recording at or by the television receiver. In examples, EPG data for the programming may be received or queried by the television receiver to determine the type of programming, rating, and/or the age group category of the programming being viewed, normally viewed, or previously viewed. Based on the type of programming the user profile may be determined or identified by the receiver. The profile may be associated with a specific user or type of user. For example, based on the characteristics of the programming being viewed on the receiver a user profile associated with young children (i.e. 10 years old or younger) may be loaded. The user profile may specify what types of notification are appropriate or preferred for users associated with the user profile. For example, a user profile associated with children may require notifications to only show escape or evacuation routes from the home. User profile associated with adults and parents may provide options for viewing the status of the sensors, the location of the incident, severity, options to contact emergency service personnel, and the like. At block 510, the notifications consistent with the active user profile may be generated and transmitted to a notification device such as a television.

Pet Monitoring

In examples, a television receiver may be directly or indirectly coupled to proximity sensors, cameras, motion sensors, pressure sensors, weight sensors, location sensors, field strength sensors, and/or the like. The data from the sensors may be used for pet monitoring applications and may be transmitted by one or more wireless or wired configurations, such as WiFi, Zigbee, Zwave, Bluetooth and/or the like. The location and/or activity of the pet, which may be a cat, a dog, or other animal, may be monitored by the system. For example, using data from sensors, a television receiver may track the location of a pet in a home or building. Tracking the location of a pet in a home may be used to locate the pet, determine its habits, track daily patterns, confirm activity (feeding, bathroom breaks, etc.). In some examples, the pet monitoring system may be used or configured to determine the current location of the pet. In some examples, the pet monitoring system may be used or configured to track and/or record the activity and locations of the throughout the day or a specific time period. In some examples, notifications about the activity and/or location of a pet may be generated.

In some examples, the location of the pet and/or the activity of the pet may be determined or tracked by sensors that are positioned around the home and/or worn or attached to a pet. In some examples, the pet may wear a collar with a tracking device. The tracking device may be used by the sensors positioned in the home to determine the location of the pet. Sensors positioned in the home may receive a signal from the tracking device worn by the pet and based on the signal strength from the tracking device the position of the pet may be determined. In some examples, the tracking device worn by the pet may receive signals from sensors positioned around the home. The readings of the signal strength at the tracking device from sensors in the home may be used to determine the location of the pet.

In some examples, the location of the pet and/or its activity may be determined using proximity sensors, cameras, and other sensors and may not require a tracking device that is worn or attached to the pet. In some examples, the tracking device worn or attached to the pet may further include telemetry capabilities and sensors. The telemetry sensors may monitor the temperature, humidity, accelerations, movement, noise, and the like of the pet. The data captured by the telemetry devices and sensors may be wirelessly transmitted directly or indirectly to the television receiver for processing and analysis.

Optionally, sensors can be used for determining a direction of travel of a pet travelling through a door or hallway, for example, which can provide further insights into a location of the pet, and to aid in identifying where and/or how long a pet has been present at one location or another. For example, magnetic sensors on a pet door can be used to determine the direction that the door was pushed as a pet traveled through the door, which can be useful in determining which side of a pet door the pet may be found.

In some cases a pet, such as a cat, for example, may hide in a location of the home. The location may be difficult to determine. The system may be used to locate the pet to make sure they are inside the home or near the home. In examples, readings from sensors may be received by the television receiver. The television receiver may process the readings and determine the location of the pet. The television receiver may provide an indication to the user regarding the location of the pet. In some examples, the location of the pet may be provided on a display device such as a television, smartphone or table. The location of the pet may be displayed on map or the home displayed on the television. The indication may include notification on a remote device such as a smart phone or tablet.

In some examples, the pet monitoring system may continuously monitor the location and/or activity of the pet. The readings from sensors may be continuously or periodically monitored to track the activity. In some examples, the sensors may be configured to transmit readings to the television receiver only when there is a change in the readings, such as when the pet changes locations for example. In some example, the location and activity of the pet may be determined on user request. The location and activity of the pet may normally not be monitored and/or tracked. The location may be determined when a user or other systems request the location of the pet. In some cases, a television or a remote device may provide an interface to request the location of pet. In some interfaces, a button, or a voice command, may be used that will initiate the television receiver to analyze sensor readings and determine the location and/or activity of the pet and provide an indication to the user.

In some examples, the monitoring system may be configured to generate user notifications for specific sensor readings, or readings related to specific activity and/or pet locations. In examples, the system may be configured to automatically generate notifications when specific sensor reading thresholds are encountered. The system may be configured to generate user notifications when sensor readings indicate that a pet has not moved for a specific time, when the pet left a specific location, when the pet is in a specific location of the home, when the pet is performing a specific activity, when the location of the pet cannot be determined, and/or the like.

For example, in one scenario, a notification is generated to alert a user to a change in condition of a pet's crate and or bedding. Moisture or liquid sensors may be incorporated into the pet monitoring system to alert a user of that a pet's crate or bedding has become soiled and/or may need to be cleaned, changed or laundered. Other examples are possible, including use of odor sensors. Optionally, a notification may indicate not only the condition of the crate or bedding, but also the time at which a change in the condition occurred. This may provide useful information to the user about a pet's habits and may be also used in in training the pet monitoring system to alert a user when it is appropriate to allow a pet to have a bathroom break, for example.

In various examples, notifications provided to a user optionally include a photograph, such as a snapshot from a security or closed-circuit camera system. Optionally, a notification can be used to activate a picture-in-picture display on a television receiver or other display device of a closed-circuit camera feed. Optionally, receipt of a notification at a television receiver or another display device, such as a smartphone or tablet, generates a display of a status indicator, such as to provide information about a pet and/or a pet's location. For example, in one embodiment, a status indicator is a small icon, or a word or short statement that is displayed on a home automation control panel or dashboard and that provides insights as to a pet's activity or location.

In some examples, the pet monitoring system may be trained to recognize the location and activity of a pet. The pet monitoring system may be trained to recognize the location and activity and generate user notifications related to the pet's location and activity. The training of the system may include positioning the pet in a location for which a user notification is desired. When the pet is in the location, the readings of the sensors may be saved and associated with a notification. When a pet is in a desired location an indication to save the location may be transmitted to the television receiver. The television receiver may save the readings of the sensors and associate them with a notification. The notification may be generated when the sensor readings are consistent with the saved readings.

The training of the system may include capturing the activity of a pet for which a user notification is desired. When the pet is performing an activity the sensor readings during the activity may be saved and associated with a notification. When a pet is performing a specific activity, an indication to save the sensor readings during the activity may be transmitted to the television receiver. The television receiver may save the readings of the sensors and associate them with a notification. The notification may be generated when the sensor readings are consistent with the saved readings.

For example, the pet monitoring system may be trained to generate an indication to the user when a pet dog is in front of the door of the house. Some dogs may go to the door and sit in front of the door when they need a bathroom break. To train the pet monitoring system to generate a notification when the dog is at the front door the user may initiate a "train" option for the pet monitoring system from the television receiver. The user may position the dog in front of the door and initiate the television receiver (e.g., via remote control, mobile device, tablet, etc.,) to record or save the sensor readings associated with the position of the dog. The user may, using a graphical interface on the television connected to the television receiver, or a mobile device, be prompted to associate the position of the dog with a notification. Likewise, the user may be prompted to specify the length of time the dog has to be in the location or the notification to be generated. After the system has been trained the pet monitoring system may monitor the location of the dog in the house and when the dog is detected to be in front of the door longer than the specified time a notification may be generated for the user that the dog may be requesting a bathroom break.

In another example, the pet monitoring system may be trained to generate an indication to the user when a pet performs a specific activity. Some pets may have a medical condition such as occasional seizures. The system may be trained to recognize a pet in medical distress and generate a notification to the user. During one seizure, the user may indicate to the system to save the sensor readings during the seizure. The movement, accelerations, position, orientation, and the like may be recorded and saved and analyzed into a profile that may be compared to real time sensor readings. When sensor readings are observed that are consistent with the recorded readings a notification to the user may be generated.

In a further example, the pet monitoring system may include audio sensors and/or may be trained to generate a notification when a pet makes an audible sound, such as a whine, hiss or bark. In some instances a notification may be generated when the sound is of a sufficient volume or duration. In some instances a notification may be generated when the sound is detected at a specific location. For example, some dogs may bark or whine at a door in order to be let out for a bathroom break. A pet monitoring system may include a microphone or other audio sensor that may be used to train the system to generate a notification when a specific audible sound or frequency is detected.

In some examples, the readings of the pet monitoring system may be combined with other monitoring and control systems. Sensor readings and the location and/or activities of the pet may be used by other monitoring systems controlled by the television receiver. For example, a fire alarm system may automatically, when a fire is detected, determine the location of a pet in the home using the pet monitoring system and notify the user of the pet's location. Different pet monitoring functions may be performed by the system. The monitoring functions may be in part controlled by the configuration data for the monitoring application. The configuration data may specify the types of sensors available, the frequency of sensor readings, the types of analysis to be performed on the sensor readings, sensor configurations options, and the like. Configuration data for different monitoring applications may be specified by the user or received from a service provider.

In another example, the pet monitoring system may provide notifications about a duration of a pet's location and/or activity. For example, a notification may be provided to a user, such as by way of a television receiver or smartphone, about the length of time that a pet has been outside or inside. Similar notifications may be provide to a user to provide information about the last time a pet entered a specific location or a specific activity associated with the pet was performed. For example, a notification may be provided that indicates the last time a pet was outside or inside or the last time food and/or water was provided to the pet. Further, it may be desirable, for example in hot climates, to ensure that a pet has adequate water. Optionally, notifications can be generated to serve as a reminder to re-fill a pet's water dish. As will be understood by the skilled artisan, sensors may be incorporated into the pet monitoring system to allow for monitoring of pet activities, such as entering or exiting through a door, eating food, drinking water, such as by incorporating magnetic and/or weight sensors into a pet door or food/water dish.

Various other aspects of control over a pet's behavior are possible. For example, a pet monitoring system may incorporate one or more sensors and/or actuators to perform specific tasks, such as to automatically lock and/or unlock a pet door or to automatically dispense food and/or water. In some situations, it may be desirable to keep a pet in a specific location for a particular amount of time, such as to require a pet to be outside for a minimum amount of time to ensure a pet has adequate time for a bathroom break. Variations are possible, however, which take into account other conditions, such as weather or time of day, to control the timing of locking or unlocking of a pet door. Optionally, an automatic pet feeder may be incorporated into a pet monitoring system to automatically dispense an amount of food and/or water, such as according to a schedule or a timer.

In some examples, sensors that may be worn or attached to a pet may be used to trigger specific activities. For example, a radio frequency ID tag or coded magnetic sensor tag may be attached to a pet's collar or a passive integrated transponder tag (also known colloquially as a "microchip") may be surgically implanted under the pet's skin. Such devices can be used to actuate a lock on a pet door, such as to only allow the pet to pass through the door but no other animals, when sensed by appropriate tag reading technologies. Variations are possible, such as where the pet door includes a camera and a "facial" type recognition or other biometric recognition algorithm are used to actuate a door lock or generate a notification. Optionally, a weight sensor may be incorporated on the ground in front of a pet door to allow only the weight of a specific pet or pets to actuate a door lock or generate a notification.

In various aspects, the pet monitoring system may be integrated and/or interact with other home automation equipment in various ways. For example, upon receiving a notification that a pet has gone outside during a specific time of day, a light corresponding to an outdoor location may be switched on. Similarly, upon receiving a notification that a pet has gone inside, a light corresponding to an outdoor location may be switched off.

Figure 6:
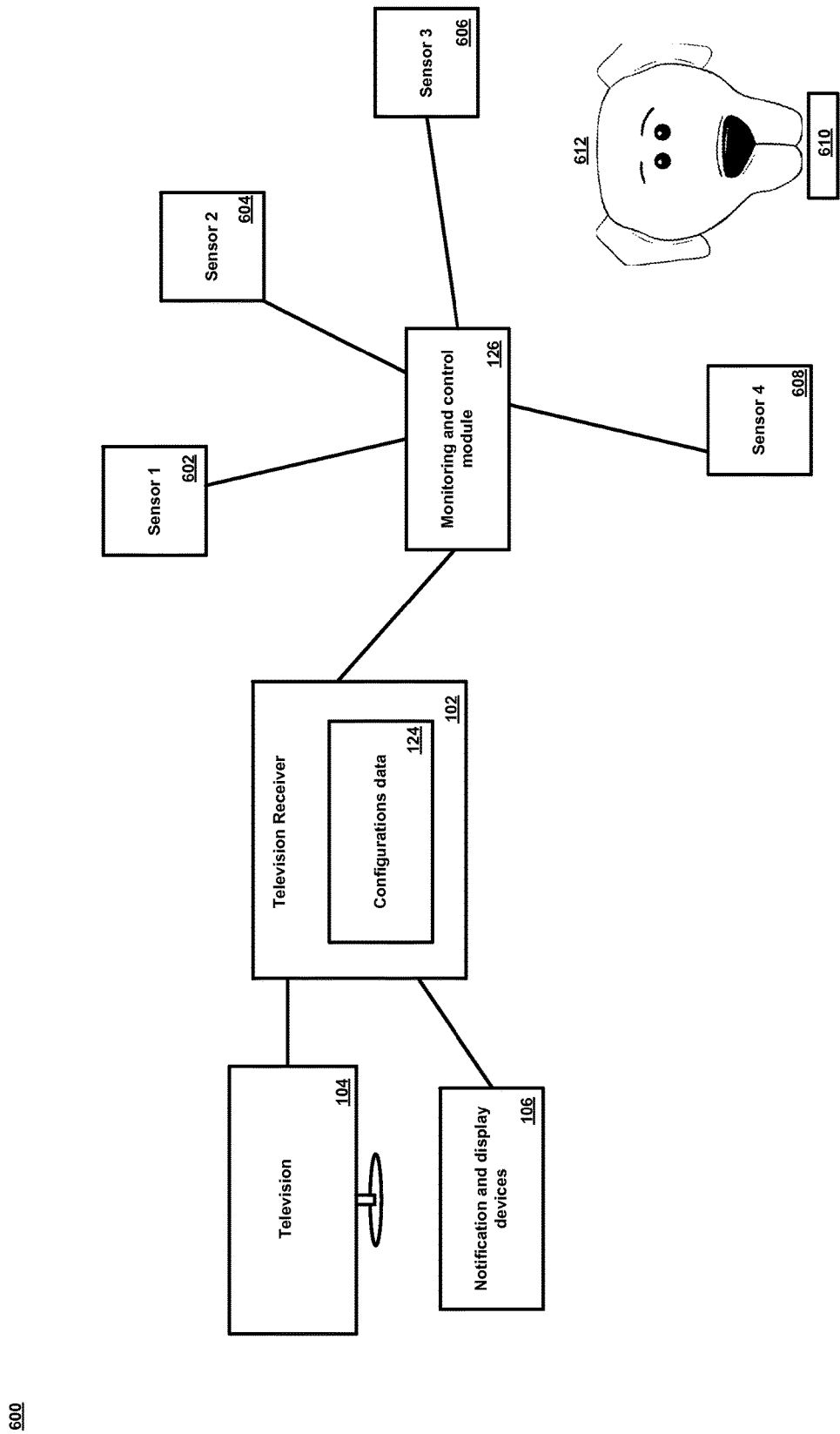
FIG. 6 shows an example system for pet monitoring.

FIG. 6 shows an example of a system 600 configured for pet monitoring using a television receiver. In some examples, at least one television receiver 102 may be located in a home. The television receiver may be connected to one or more display devices 104 and other notification devices 106 such as mobile tablets, phones, and the like. The television receiver 102 may receive sensor data. In some examples the sensor data may be received via a monitoring and control module 126 that is coupled to the sensors 602, 604, 606, 608, 610. The sensors may include proximity sensors, field sensors, accelerometers, cameras, motion sensors, radio frequency tags and sensors and/or the like. The sensors may be positioned throughout the home or in specific locations of the home. Some sensors may be attached to a pet 612. The location of the pet and/or activity of the pet may be monitored by the television receiver according to the configuration data 132 defining the monitoring application.

Figure 7:
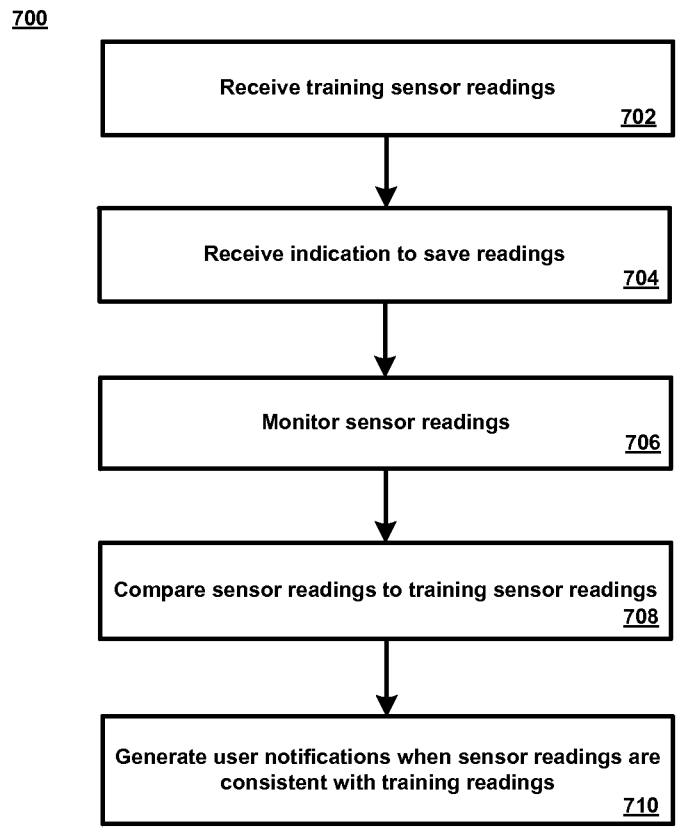
FIG. 7 shows a second example method according to the disclosure.

FIG. 7 illustrates an example of a method 700 for pet monitoring using a television receiver. The method 700 may be performed using the systems previously described. For instance, the system 100 of FIG. 1 and the system 600 of FIG. 6 may be used to perform or otherwise implement the method 700. Components of such systems may be implemented using hardware, software, and/or firmware. Further, one or more steps of the method 700 may be implemented by at least one of the components of a computer system or device, such as that discussed in further detail below in connection with FIG. 12.

At block 702, the television receiver may receive sensor readings. The sensor readings may be readings from sensors configured to determine the position and/or activity of a pet inside or near a home. The sensors may be distributed in the home or around the home and some sensors may be worn or attached to the pet. At block 702, the television receiver may receive sensor readings associated with a training routine. The training routine may be used teach the system of the locations and/or activities of the pet for which the user would like to receive notifications. At block 704, the user may generate an indication that the position and/or activity of the pet associated with the training readings have special meaning and that the user desires to receive an indication when sensor readings that are the same or similar to the training readings are received. The training readings may be saved in the television receiver. The training readings may be further processed to determine their characteristics, generate comparison templates, and the like.

At block 706, the television receiver may monitor the sensor readings and compare the readings to the training readings in block 708. At block 710, the television receiver may generate a user indication additional sensor readings are consistent with the training sensor readings. Other examples are possible. For instance, although the method 700 is described in the context of pet monitoring, the method 700 may be adapted to location detection of any object. Objects such as keys, wallets, computers, and the like may be fitted with electronic tracking devices for monitoring their location. Sensors in the home may monitor the location of the objects and provide an indication as to their location upon user request.

Baby Monitoring

In examples, a television receiver may be directly or indirectly coupled to proximity sensors, cameras, motion sensors, pressure sensors, location sensors, temperature sensors, field strength sensors, and/or the like. The data from the sensors may be used for baby or child monitoring applications. In examples, sensors such as temperature sensors, moisture sensors, movement sensors, accelerometers, infrared sensors, cameras, and/or the like may be positioned on or near a baby's bed or crib. The sensors may transmit data to a television receiver. The television receiver may analyze the data and monitor the health, status, and the well-being of the baby. Sensor readings that indicate possible distress or problems may be configured to trigger a user notification. The user notification may be displayed on a television. The notification may be overlaid over television programming or as a new display. The notifications may show the possible distress and sensor readings. For example, sensors such as temperature sensors may be embedded in the mattress of a baby's crib. The temperature readings may be transmitted to the television receiver and monitored. When the temperature sensors indicate that the baby's temperature exceeds a threshold value and indication may be generated by the television receiver and transmitted to the television or a mobile device such as a smart phone.

In examples, a baby or child monitoring system may track the location and/or activity of the child. Similarly to the pet monitoring application, sensors may be positioned around and/or on the child to monitor their position and/or activity. Sensor readings may be received by the television receiver to monitor the location and/or the activity. Locations and/or activity characteristics may be configured to generate a notification to the user. Areas of the house may be configured or marked as unsafe in the home for a child and the television receiver may be configured to generate a notification when the child approached the areas marked as unsafe. For example, stairs, machinery, chemical storage may be dangerous to a child. When sensors indicate that a child is close to an unsafe area the television receiver may be configured to generate a notification to the user.

In some examples, when a child is detected to approach or be located in an area designed as unsafe of off limits to the child the television receiver may initiate the generation of a warning signal or a message to divert the child away from the unsafe area. In some examples the television receiver may use one or more control units, audio devices, and the like to generate alarms, or audio instructions directed to the child. For example, an audio recording of the parents' voice may be played back via a television that is closest to the child. The message may be recorded to urge the child to go to a different location or confuse the child to stop its movement while the parent is notified. In some examples the television receiver may automatically turn on a television closest to the child and tune to children programming to attract the child away from the unsafe area. Unsafe areas or areas that are off limits to the child may be designated by the user. The unsafe areas may be designated using an interface on a mobile device or television. Using an input device a user may specify areas on a map for which an alarm or a notification is sent when the child is near the area.

In some examples the unsafe or off-limits areas may be designed or designated by positioning special sensors or position indicators. In some environments the off-limits or unsafe areas may frequently change. In examples, the "safe" and "unsafe" areas of home for a child may be quickly designated by positioning specially marked electronic markers or beacons that mark an area of a home as safe or unsafe for a child. Electronic beacons that interact or identify their location and/or properties to nearby sensors may be positioned in desired areas. A safe position indicator may be positioned in a room or area in which the child is preferred to be in. Unsafe position indicators may be located near hazards or areas of the home where it may be unsafe for the child. Sensors of the child monitoring system that are located near the position indicators may detect the position indicators and type of indicator. The television receiver may receive the sensor readings and their proximity to the location indicators. The television receiver may process the sensor readings to determine the location of the child relative to the location indicators. The television receiver may be configured to generate notifications when the child is close to sensors that are near "unsafe" position indicators or when a child leaves an area of sensors that are close to "safe" position indicators. In examples the position indicators may be moved and relocated in real time or anytime. Based on the proximity of the indicators to certain censors, the safe and unsafe areas of home may be quickly determined.

Figure 8:
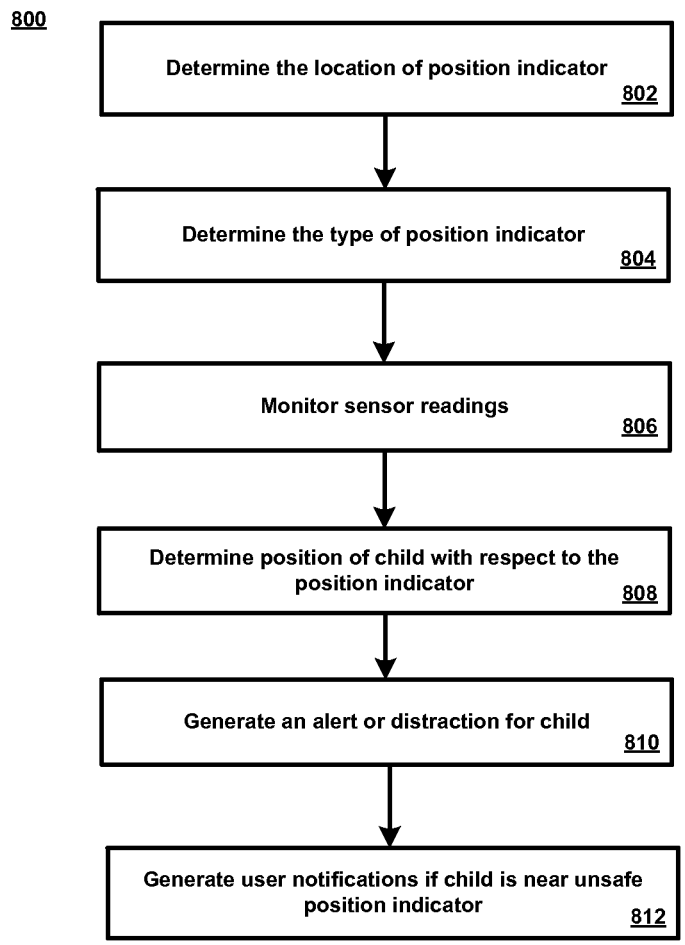
FIG. 8 shows a third example method according to the disclosure.

FIG. 8 illustrates an example of a method 800 for baby monitoring using a television receiver. The method 800 may be performed using the systems previously described. Components of such systems may be implemented using hardware, software, and/or firmware. Further, one or more steps of the method 800 may be implemented by at least one of the components of a computer system or device, such as that discussed in further detail below in connection with FIG. 12.

At block 802, the television receiver may receive sensor readings of the child monitoring system. The television receiver may receive sensor readings. The sensor readings may be analyzed to determine the relative position of the position indicators to each sensor. At block 804, the television receiver may further determine the type of position indicator that is near each sensor. The position indicators may determine safe or unsafe areas of the home. Based on the relative proximity of the position indicators to the sensors, the television receiver may determine which areas of the home may be unsafe or off-limits to the child. At block 806, the sensor readings may be further monitored to determine the location and/or activity of the child.

At block 808, the sensor readings may be analyzed to determine the relative position of the child to the position indicators and therefore the location of the child with respect to the designated safe and unsafe areas of the home. If the child is entering or located in an unsafe area, the television receiver may generate audio or video output to alert or distract the child away from the unsafe area in block 810. In some examples the audio or video content may be recorded voice of the parent of the child instructing the child to stay away from an area. In some examples the audio or video content may be children's programming displayed on a nearby television connected to the television receiver. At block 812, the television receiver may generate a notification to the user if the child is approaching or is near an unsafe area.

Occupant Monitoring and Simulation

In examples, a television receiver may be directly or indirectly coupled to proximity sensors, cameras, motion sensors, pressure sensors, location sensors, temperature sensors, control units and/or the like. The data from the sensors may be used for monitoring the occupancy of a home and to simulate an occupied home. Sensors in a home may be used to monitor and learn user patters and behaviors. Occupant behavior and usage patterns may be reproduced when the occupants are not home. Occupant behavior may be simulated or anticipated by the system based on previous behavior.

In examples, a television receiver may receive sensor readings from sensors around a home and store the readings for analysis. Sensor readings may include sensor readings that indicate that a door/window was opened, that the lights were turned on/off, temperature settings, location of the user, television watching habits, and/or the like. The readings may be stored and analyzed in the television receiver. The readings may be analyzed to determine usage patterns for the occupants of the home. Using the stored sensor data, the television receiver may determine when the home is typically occupied, what areas of the home are used at what times of the day, what appliances are used, which lights are on at what times. The analysis may infer trends for each day, day of the week, month, yearly trends, and/or the like.

Based at least in part on the determined trends, the system may anticipate user's behavior and control devices in the home in anticipation of the user. Based on the pattern of usage, the home lights may be automatically turned on prior to the user's arrival. The temperature of the home may be adjusted. Appliances may be turned on/off, and/or the television may be tuned to a specific channel.

In examples the adjustments and control of devices may be made based on the typical expected usage from the user. In examples the adjustments and control of devices may be made such that the adjustment is made at least one minute before the expected usage by the user. In some examples the range of expected usage times may have a wide range or variability. In examples the control of the devices may be times such that the control occurs before at least 50% or at least 90% of the expected usage.

For example, a user may come home from work on most days between 5:30 and 6:30. On same rare instances the user may come home at 5:10. When the user comes home he usually turns on the lights, start a tea kettle for some hot water, turns on the television to watch the news. The television receiver may recognize the daily pattern of the user from the sensor readings. After a week or two weeks or less of reading sensors and analyzing the daily schedule of the user the television receiver may anticipate the daily activities and generate indications to control units or control system controlling the lights, tea kettle, television to turn on in anticipation of the user's arrival. In some examples the system may activate the lights, the television, and the tea kettle at 5:30 in anticipation of the user. In some examples the activation may be initiated by the user opening the front door in time window associated with the user's normal arrival time.

When the user is away from the home, on a vacation, for example, the system may be used to mimic or simulate the user's presence to discourage burglary for example. Lights, appliances, televisions, and the like may be activated and deactivated according to the user's normal daily patterns. In some cases the system may add or inject random variations to the simulated home activity. The times of the activation of lights, appliances, and the like may be randomly varied within a predefined window to avoid a completely repeatable pattern that may be recognized by a burglar.

In examples, the television receiver may receive, from a service provider data or information regarding the burglary pattern in the neighborhood or the area of the home. The burglary patterns may indicate that theft or home intrusions are more likely at specific times of the day, week, or year. The data may indicate common points of entry into the home. Regional burglary data may be used to adjust the times of the week, times of the day, and/or areas of the home for which lights, appliances, and other deterrents are activated. In some examples, the activation of devices in the home may be related to the time of the year, or holiday season. The times of the day, the types of devices that are activated may depend on configuration data obtained from the service provider. The television tuner may be configured to tune to a specific channel or programming stream or may be configured to play a recorded message or recorded programming. The type of programming may depend on the holiday season. During Christmas season, for example, the television receiver may be configured to tune to a channel with Christmas music to further give the impression that the home is occupied.

Figure 9:
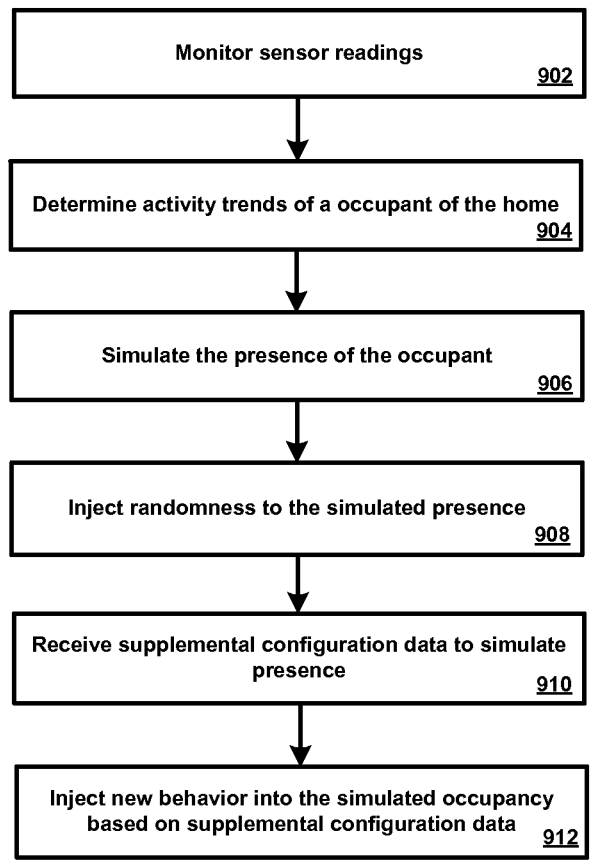
FIG. 9 shows a fourth example method according to the disclosure.

FIG. 9 illustrates an example of a method 900 for simulating the presence of an occupant in a home using a television receiver. The method 900 may be performed using the systems previously described. Components of such systems may be implemented using hardware, software, and/or firmware. Further, one or more steps of the method 900 may be implemented by at least one of the components of a computer system or device, such as that discussed in further detail below in connection with FIG. 12.

At block 902, the television receiver may receive and store sensor readings related to a user's activity in a home. The location of the user, television viewing habits, activations of lights, appliances, and the like may be tracked. At block 904, the television receiver may analyze the sensor readings to determine activity trends of the user. The television receiver may determine trends for specific days, weeks, times of the day. The analysis may include statistical analysis and likelihood analysis and the like. When the occupant is not home, the system may be configured to simulate the occupancy of the home based on the usage trends of the user in block 906. The simulation of occupancy may include activating lights, appliances, playing sounds, music, television programs, controlling the heating and ventilation system. In some examples, in block 908 the television receiver may inject randomness into the simulated home activity. Lights, for example, may be randomly turned on/off, the television may be sometimes off. The randomness may be injected to prevent a noticeable or exact pattern in the activity that may indicate a simulated occupancy of the home.

At block 910, additional configuration data may be received from a service provider, from an external source, or loaded form memory storage. The configuration data my include information related to the holiday seasons, specific times of the year, burglary of home intrusion information. The configuration data my include information regarding suggestions the times, locations, and behavior of activating devices in the simulated home occupancy to deter intruders or burglars. In examples the additional configuration data may include suggestions for tuning to specific channels to programming streams that may be consistent with the time of the year and/or holiday season.

At block 912, additional behavior based on the additional configuration data may be injected into the simulated occupancy of the home. The television receiver may inject all of the recommendation into the simulated occupancy. In some cases the suggestions from the additional configuration data may have a score or a weight associated with the suggestion. The score or weight may be proportional or related to the benefit or importance of the suggestion. The television receiver may analyze and calculate which suggestions to adapt into the simulated occupancy of the home. The television receiver may analyze and choose the suggestion based at least in part on the score of the suggestions and how much the suggestions differ from the normal usage of behavior associated with normal occupants of the home.

Building or Residence Exit

As mentioned above, the television receiver 102 may output for presentation by a display device a map and/or escape instructions in event of a fire or other alarm condition. Such an implementation may be beneficial and/or advantageous in many respects. For example, if a fire breaks out in a home or larger building an alarm may sound, however, in such an emergency situation it may be difficult for an individual to respond in a rational way or manner in order to determine which or what is the best exit or route to take. In some instances, the shortest most convenient exit may not be the best because, for example, it might be blocked by a potential hazard. Accordingly, it is contemplated that the television receiver 102 may implement an algorithm to generate and output for display a map or escape instructions on or by at least one of each of a plurality of devices communicatively coupled to the television receiver 102. It is further contemplated that the map or escape instructions may be different depending on location and/or status of each of the plurality of devices communicatively coupled to the television receiver 102.

For example, in a scenario in which a particular hazard detector in a stairwell indicates presence of "Fire," all televisions "downstairs" may be automatically brought out of standby by the television receiver 102 to display a warning notification or message "Fire has been detected by the hallway hazard detector; exit through the front door immediately," indicating that a safest or most direct exit is via the front door. However, all televisions "upstairs" may be automatically brought out of standby by the television receiver 102 to display a warning notification or message "Fire has been detected by the hallway hazard detector; exit via the fire escape which is accessible through the window in the bedroom upstairs," indicating that a the safest or most direct exit is via the fire escape. Still other examples are possible. For example, a warning notification or message "Fire has been detected by the hallway hazard detector; exit through the front door immediately if you are currently downstairs, or if you are currently upstairs exit via the fire escape which is accessible through the window in the bedroom upstairs," may be generated by the television receiver 102 and transmitted in some manner (e.g., email, SMS messaging) to a particular mobile device so an individual may be supplied the map or escape instructions via their mobile device. Advantageously, odds of survival or at least a swift exit may be substantially increased when multiple methods by which the television receiver 102 provides the map or escape instructions or information are leveraged, as discussed in further detail below.

Figure 10:
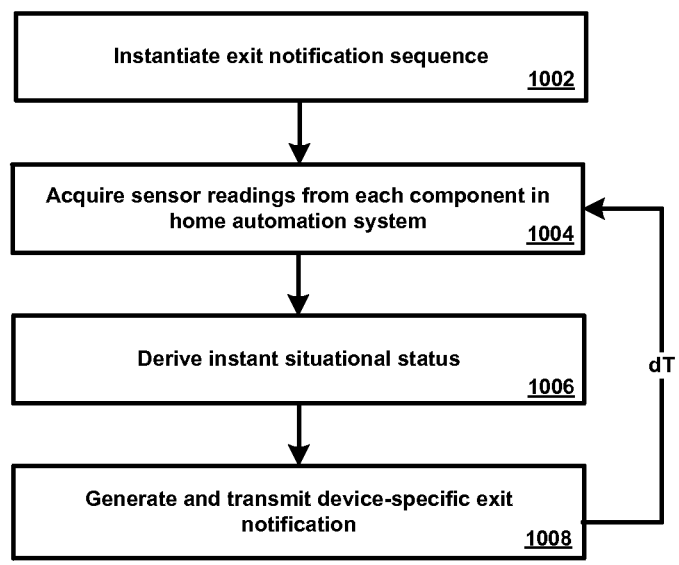
FIG. 10 shows a fifth example method according to the disclosure.

For instance, referring now to FIG. 10, a fifth example method 1000 is shown in accordance with the present disclosure. The method 1000 may be performed using the systems previously described. Components of such systems may be implemented using hardware, software, and/or firmware. Further, one or more steps of the method 1000 may be implemented by at least one of the components of a computer system or device, such as that discussed in further detail below in connection with FIG. 12.

At step 1002, a television receiver that functions as a home automation gateway device or system, that is, a television receiver configured and/or arranged to communicate with multiple home automation-related systems and/or devices installed to a particular residence, may instantiate an exit notification sequence in response to a particular signal received from a particular system or sensor or device. For instance, the television receiver may be coupled to at least one fire and/or smoke detector that which at any particular instance in time may detect a particular alarm condition, e.g., instantaneous temperature >=x (arbitrary units) and instantaneous smoke concentration >=y (arbitrary units), etc., where x and y may each represent a predetermined/predefined threshold value. Here, it is contemplated that the fire and/or smoke detector may in response to detection of the particular alarm condition report to the television receiver so that the television receiver may at step 1002 instantiate an exit notification sequence in accordance with the present disclosure.

At step 1004, the television receiver may query each and every home automation-related system and/or device communicatively coupled thereto, to command the same to acquire a particular reading. For instance, the television receiver may query each one of a plurality of fire and/or smoke detectors installed within the residence to acquire and report back to the television receiver instantaneous temperature and instantaneous smoke concentration. The present disclosure is however not so limited. For instance, the television receiver may query each and every element of an HVAC system within the residence, each and every appliance within the residence, and so forth, to acquire and report back to the television receiver a particular reading so that, at step 1006, the television receiver may derive an instant (emergency) situational status of the residence as a whole or in its entirety.

For instance, at step 1006 it is contemplated that the television receiver may determine based on sensor readings received at step 1004, that it is very likely that a fire (at least at an instance point in time) is present but is localized to a stairway or stairwell of the residence. In this example, it is contemplated that the television receiver may, based upon the sensor readings received at step 1004, generate or derive a high-level or representative map of the residence. Next, at step 1008, it is contemplated that the television receiver may, based upon the high-level or representative map of the residence, generate a plurality of device-specific exit notifications that each may comprise of a map or escape instructions to assist any individual within the residence to respond in a rational way or manner in order to determine which or what is the best exit or route to take. It is further contemplated that the map or escape instructions may be different depending on location and/or status of each of the plurality of devices communicatively coupled to the television receiver.

For instance, to continue with the example "Fire" scenario in which it has been determined by the television receiver that fire is present but is localized to a stairway or stairwell of the residence, the television receiver may activate each and every television "downstairs" to display a warning notification or message "Fire has been detected in or near the stairwell; exit through the front door immediately," indicating that a safest or most direct exit is via the front door. However, the television receiver may activate each and every television "upstairs" to display a warning notification or message "Fire has been detected in or near the stairwell; exit via the fire escape which is accessible through the window in the bedroom upstairs," indicating that a safest or most direct exit is via the fire escape. Still other examples are possible. For example, the television receiver may transmit a warning notification or message "Fire has been detected in or near the stairwell of your home; exit through the front door immediately if you are currently downstairs, or if you are currently upstairs exit via the fire escape which is accessible through the window in the bedroom upstairs," to and for presentation by a particular mobile device so that an individual may be supplied the map or escape instructions via their mobile device. Still many other examples are possible as well, some of which may or may not be implementation-specific.

It is contemplated that process flow within the example method 1000 may branch back to step 1004 after a predetermined and user-configurable time period, such as 60 seconds for example. In this manner, the television receiver may continuously supply or provide to any particular individual up-to-date exit map or escape instructions on or by at least one of each of a plurality of devices communicatively coupled to the television receiver. Advantageously, odds of survival or at least a swift exit may be substantially increased when multiple methods by which the television receiver provides the map or escape instructions or information are leveraged in a continuous manner such as that described in connection with FIG. 10.

Although discussed in the context of a fire and/or smoke alarm condition or scenario, it is contemplated that the television receiver 102 may implement an algorithm to generate and output for display a map or escape instructions on or by at least one of each of a plurality of devices communicatively coupled to the television receiver 102, based upon readings from any particular sensor, system, or component communicatively coupled to the television receiver 102 in a smart-home environment in which the television receiver 102 functions as a gateway system or device or controller. For instance, referring now to FIG. 11, an example home automation system 1100 is shown in accordance with the present disclosure. As may be understood upon inspection, the home automation system 1100 is similar to at least the system 100 of FIG. 1, the system 400 of FIG. 4, and the system 600 of FIG. 6 as described above.

Figure 11:
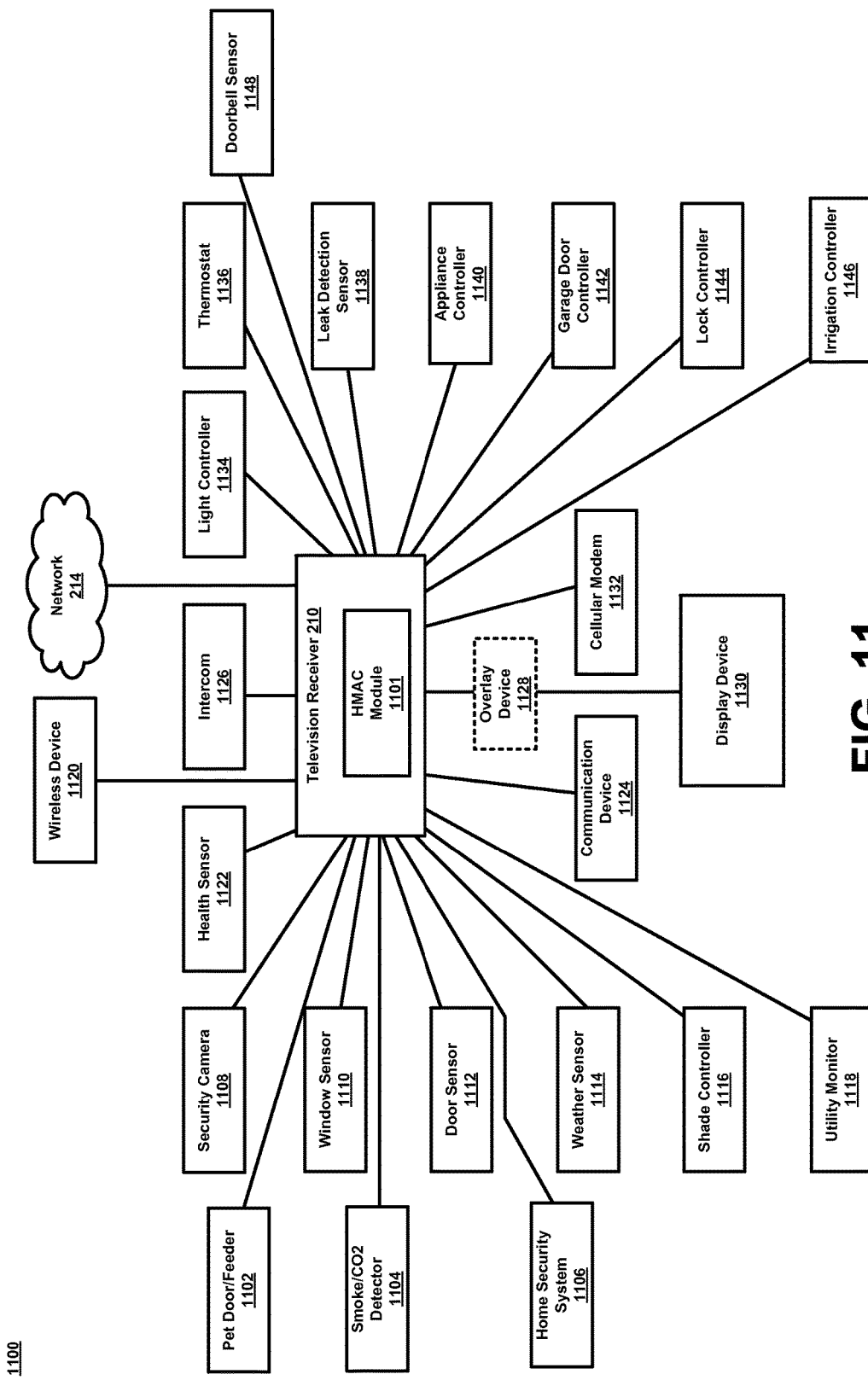
FIG. 11 shows an example home automation system.

For instance, the home automation system 1100 is hosted by the television receiver 102, and thus the television receiver 102 as shown in FIG. 11 includes an HMAC (Home Monitoring and Control) module 1101, and may be considered a home automation gateway device or system. For example, the television receiver 102 may be configured and/or arranged to communicate with multiple in-home or on-residence home automation-related systems and/or devices. Some examples of which include, but are not limited to: at least one pet door/feeder 1102, at least one smoke/$CO_2$ detector 1104, a home security system 1106, at least one security camera 1108, at least one window sensor 1110, at least one door sensor 1112, at least one weather sensor 1114, at least one shade controller 1116, at least one utility monitor 1118, at least one wireless device 1120, at least one health sensor 1122, at least one communication device 1124, at least one intercom 1126, at least one overlay device 1128, at least one display device 1130, at least one cellular modem 1132, at least one light controller 1134, at least one thermostat 1136, at least one leak detection sensor 1138, at least one appliance controller 1140, at least one garage door controller 1142, at least one lock controller 1144, at least one irrigation controller 1146, and at least one doorbell sensor 1148. The home automation system 1100 of FIG. 11 is just an example. Other examples are possible.

It is contemplated that each of the elements of FIG. 11, that which with the television receiver 102 communicates, may use different communication standards. For instance, one or more elements may use or otherwise leverage a ZigBee® communication protocol, while one or more other devices may communicate with the television receiver 102 using a Z-Wave® communication protocol. Other forms of wireless communication may be used by particular elements of FIG. 11 to enable communications to and from the television receiver 102, such as any particular IEEE (Institute of Electrical and Electronics Engineers) standard or specification or protocol, such as the IEEE 802.11 technology for example.

In some examples, a separate device may be connected with the television receiver 102 to enable communication with the smart home automation systems or devices of FIG. 11. For instance, the communication device 1124 as shown coupled with the television receiver 102 may take the form of a dongle. In some examples, the communication device 1124 may be configured to allow for Zigbee®, Z-Wave®, and/or other forms of wireless communication. In some example, the communication device 1124 may connect with the television receiver 102 via a USB (Universal Serial Bus) port or via some other type of (e.g., wired) communication port. Accordingly, the communication device 1124 may be powered by the television receiver 102 or may be separately coupled with another different particular power source. In some examples, the television receiver 102 may be enabled to communicate with a local wireless network and may use communication device in order to communicate with devices that use a ZigBee® communication protocol, Z-Wave® communication protocol, and/or some other wireless communication protocols.

In some examples, the communication device 1124 may also serve to allow or enable additional components to be connected with the television receiver 102. For instance, the communication device 1124 may include additional audio/video inputs (e.g., HDMI), component, and/or composite inputs to allow for additional devices (e.g., Blu-Ray players) to be connected with the television receiver 102. Such a connection may allow video comprising home automation information to be "overlaid" with television programming, both being output for display by a particular presentation device. Whether home automation information is overlaid onto video on display may be triggered based on a press of a remote control button by an end-user, or based on a press or touch of control Regardless of whether the television receiver 102 uses the communication device 242 to communicate with any particular home automation device shown in FIG. 11 or other particular home automation device not explicitly shown in FIG. 11, the television receiver 102 may be configured to output home automation information for presentation via the display device 1130. It is contemplated that the display device 1130 could correspond to any particular type of computing device, such as a smartphone, television, tablet, etc., such as that discussed in connection with FIG. 12 below. Such information may be presented simultaneously, concurrently, in tandem, etc., with any particular television programming received by the television receiver 102 via any particular communication channel as discussed above. It is further contemplated that the television receiver 102 may also, at any particular instant or given time, output only television programming or only home automation information based on preferences or commands or selections of particular controls within an interface of or by any particular end-user. Furthermore, an end-user may be able to provide input to the television receiver 102 to control the home automation system 1100, in its entirety as hosted by the television receiver 102 or by the overlay device 1128.

In some examples, indicated by intermittent line in FIG. 11, the overlay device 1128 may be coupled with the television receiver 102 to allow or enable home automation information to be presented via the display device 1130. It is contemplated that the overlay device 1128 may be configured and/or arranged to overlay information, such as home automation information, onto a signal that will ultimately enable the home automation information to be visually presented via the display device 1130. In this example, the television receiver 102 may receive, decode, descramble, decrypt, store, and/or output television programming. The television receiver 102 may output a signal, such as in the form of an HDMI signal. Rather than being directly input to the display device 1130, however, the output of the television receiver 102 may be input to the overlay device 1128. Here, the overlay device 1128 may receive the video and/or audio output from the television receiver 102.

The overlay device 1128 may add additional information to the video and/or audio signal received from the television receiver 102 so as to modify or augment or even "piggyback" on the same. That video and/or audio signal may then be output by the overlay device 1128 to the display device 1130 for presentation thereon. In some examples, the overlay device 1128 may include or exhibit an HDMI input/output, with the HDMI output being connected to the display device 1130. While FIG. 11 shows lines illustrating communication between the television receiver 102 and other various devices, it will be appreciated that such communication may exist, in addition or in alternate via the communication device 1124 and/or the overlay device 1128. In other words, any particular input to the television receiver 102 as shown in FIG. 11 may additionally, or alternatively, be supplied as input to one or both of the communication device 1124 and the overlay device 1128.

As alluded to above, the television receiver 102 may be used to provide home automation functionality, but the overlay device 1128 may be used to modify a particular signal so that particular home automation information may be presented via the display device 1130. Further, the home automation functionality as detailed throughout in relation to the television receiver 102 may alternatively be provided by or via the overlay device 1128. Using the overlay device 1128 to present automation information via the display device 1130 may be beneficial and/or advantageous in many respects. For instance, it is contemplated that multiple devices may provide input video to the overlay device 1128. For instance, the television receiver 102 may provide television programming to the overlay device 1128, a DVD/Blu-Ray player may provide video to the overlay device 1128, and a separate IPTV device may stream other programming to the overlay device 1128.

Regardless of the source of particular video/audio, the overlay device 1128 may output video and/or audio that has been modified or augmented, etc., to include home automation information and then output to the display device 1130. As such, regardless of the source of video/audio, the overlay device 1128 may modify the audio/video to include home automation information and, possibly, solicit for user input. For instance, in some examples the overlay device 1128 may have four video inputs (e.g., four HDMI inputs) and a single video output (e.g., an HDMI output). In other examples, the television receiver 102 may exhibit such features or functionality. As such, a separate device, such as a Blu-ray player may be connected with a video input of the television receiver 102, thus allowing the television receiver 102 to overlay home automation information when content from the Blu-Ray player is being output to the display device 1130.

Regardless of whether the television receiver 102 is itself configured to provide home automation functionality and output home automation input for display via the display device 1130 or such home automation functionality is provided via the overlay device 1128, home automation information may be presented by the display device 1130 while television programming is also being presented by display device 1130. For instance, home automation information may be overlaid or may replace a portion of television programming, such as broadcast content, stored content, on-demand content, etc., presented via the display device 1130. Such augmentation of the television programming may be performed directly by the television receiver 102 (which may or may not be in communication with the communication device 242), the overlay device 1128, or even a combination thereof. Such augmentation may result in solid or opaque or partially transparent graphics being overlaid onto television programming (or other forms of video) output by the television receiver 102 and displayed by a television or smartphone, etc.

Furthermore, the overlay device 1128 and/or the television receiver 102 may add or modify sound to television programming also or alternatively. For instance, in response to a doorbell ring, a sound may be played through a television (or connected audio system). In addition or in alternate, a graphic may be displayed. In other examples, other particular camera data (e.g., nanny camera data) and/or associated sound or motion sensors may be integrated in the system and overlaid or otherwise made available to a user. For example, detection of a crying baby may trigger an on-screen alert to a user watching television. As another example, an escape route or map may be overlaid or otherwise made available.

Still referring to FIG. 11, the television receiver 102 and/or the overlay device 1128, depending on implementation-specific details, may communicate with one or more wireless devices, such as the wireless device 1120. The wireless device 1120 may represent a tablet computer, cellular phone, laptop computer, remote computer, or some other device through which a user may desire to control home automation settings and view home automation information in accordance with the principles of the present disclosure. Such a device also need not necessarily be wireless, such as in a desktop computer example. It is contemplated that the television receiver 102, communication device 1124, and/or the overlay device 1128 may communicate directly with the wireless device 1120, or may use a local wireless network, such as network 214 for instance. The wireless device 1120 may be remotely located and not connected with a same local wireless network as one or more of the other devices or elements of FIG. 11. Via the Internet, the television receiver 102 and/or the overlay device 1128 may transmit a notification to the wireless device 1120 regarding home automation information. For instance, a third-party notification server system, such as a notification server system operated by Apple Inc., of Cupertino, Calif. may be used to send such notifications to the wireless device 1120.

Various home automation devices may be in communication with the HMAC module 1101 of the television receiver 102 (collectively, "television receiver 102" throughout) and/or the overlay device 1128, depending on implementation-specific details. Such home automation devices may use similar or disparate communication protocols. Such home automation devices may communicate with the television receiver 102 directly or via the communication device 1124. Such home automation devices may be controlled by a user and/or have a status viewed by a user via the display device 1130 and/or wireless device 1120. Such home automation devices may include, but are not limited to:

One or more cameras, such as the security camera 1108. It is contemplated that the security camera 1108 may be installed indoors, outdoors, and may provide a video and, possibly, an audio stream that may be presented via the wireless device 1120 and/or display device 1130. Video and/or audio from the security camera 1108 may be recorded by the overlay device 1128 and/or the television receiver 102 continuously, in a loop as per a predefined time period, upon an event occurring, such as motion being detected by the security camera 1108, and etc. For example, video and/or audio from security camera 1108 may be continuously recorded such as in the form of a rolling window, thus allowing a period of time of video/audio to be reviewed by a user from before a triggering event and after the triggering event. Video/audio may be recorded on a persistent storage device local to overlay device 1128 and/or the television receiver 102, and/or may be recorded and stored on an external storage devices, such as a network attached storage device or the server 218 of FIG. 2.

In some examples, video may be transmitted across a local and/or wide area network to other one or more other storage devices upon occurrence of a trigger event, for later playback. For initial setup for example, a still may be captured by the security camera 1108 and stored by the television receiver 102 for subsequent presentation as part of a user interface via the display device 1130. In this way, an end-user can determine which camera, if multiple cameras are present or enabled, is being set up and/or later accessed. For example, a user interface may display a still image from a front door camera, which may be easily recognized by the user because it shows a scene near or adjacent a front door of a residence, to allow a user to select the front door camera for viewing as desired.

Furthermore, video and, possibly, audio from the security camera 1108 may be available live for viewing by a user via the overlay device 1128 or the television receiver 102. Such video may be presented simultaneously with television programming being presented. In some examples, video may only be presented if motion is detected by the security camera 1108, otherwise video from the security camera 1108 may not be presented by a particular display device presenting television programming. Also, such video (and, possibly, audio) from the security camera 1108 may be recorded by the television receiver 102 and/or the overlay device 1128. In some examples, video and/audio acquired by the security camera 1108 may be backed up to a remote storage device, such as cloud-based storage for instance. Other data may also be cached to the cloud, such as configuration settings. Thus, if one or both of the television receiver 102 and overlay device 1128 malfunction, then a new device may be installed and the configuration data loaded onto the device from the cloud.

Further, one or more window sensors and door sensors, such as the window sensor 1110 and the door sensor 1112 may be integrated in to or as part of the home automation system 1100, and each may transmit data to the television receiver 102, possibly via the communication device 1124, or the overlay device 1128, that indicates the status of a window or door, respectively. Such status may indicate open window or door, an ajar window or door, a closed window or door, and etc. When a status change occurs, an end-user may be notified as such via the wireless device 1120 and/or the display device 1130, within an EPG or like interface for example. Further, a user may be able to view a status screen within an EPG or other interface to view the status one or more window sensors and/or one or more door sensors throughout the location.

In some examples, the window sensor 1110 and/or the door sensor 1112 may have integrated "break" sensors to enable a determination as to whether glass or a hinge, or other integral component, etc., has been broken or compromised. Here, as well as in all instances of home automation related data as acquired and served to the television receiver 102 and/or overlay device 1128 by particular elements of FIG. 11, it is contemplated that one or both of the window sensor 1110 and the door sensor 1112 may be controlled via interaction with particular controls as provided within or by an EPG or like interface, and information or data as acquired by one or both of the window sensor 1110 and door sensor 1112 may be manipulated, consolidated, etc., as desired, and also made accessible within or by an EPG or like interface, such as a pop-up window, banner, and/or any other "interface" or "display" or the like, in accordance with the principles of the present disclosure.

Further, one or more smoke and/or $CO_2$ detectors, such as detector 1104, may be integrated in to or as part of the home automation system 1100. As such, alerts as to whether a fire (e.g., heat, smoke), $CO_2$, radon, etc., has been detected can be sent to the television receiver 102, wireless device 1120, etc., and/or one or more emergency first responders. Accordingly, when an alert occurs, a user may be notified as such the via wireless device 1120 or the display device 1130, within an EPG or like interface for example. Further, it is contemplated that such an interface may be utilized to disable false alarms, and that one or more sensors dispersed throughout a residence and/or integrated within the home automation system 1100 to detect gas leaks, radon, or various other dangerous situations.

Further, a pet door and/or feeder, such as pet door and/or feeder 1102 may be integrated in to or as part of the home automation system 1100. For instance, a predefined amount of food may be dispensed at predefined times to a pet. A pet door may be locked and/or unlocked. The pet's weight or presence may trigger the locking or unlocking of the pet door. For instance, a camera located at the pet door may be used to perform image recognition of the pet or a weight sensor near the door may identify the presence of the pet and unlock the door. A user may also lock/unlock a pet door and/or dispense food for example from a "remote" location. Further, a weather sensor, such as the weather sensor 1114 may be integrated in to or as part of the home automation system 1100, and may allow or enable the television receiver 102 and/or overlay device 1128 to receive, identify, and/or output various forms of environmental data, including local or non-local ambient temperature, humidity, wind speed, barometric pressure, etc.

Further, a shade controller, such as shade controller 1116, may be integrated in to or as part of the home automation system 1100, and may allow for control of one or more shades, such as window, door, and/or skylight shades, within a home or residence or any other location. The shade controller 1116 may respond to commands received from the television receiver 102 and/or overlay device 1128 and may provide status updates, such as "shade up" or "shade 50% up" or "shade down" and etc. Further, a utility monitor, such as utility monitor 1118, may be integrated in to or as part of the home automation system 1100, and may serve to provide the television receiver 102 and/or overlay device 1128 with utility data or information, such as electricity usage, gas usage, water usage, wastewater usage, irrigation usage, etc. A user may via an EPG or like interface view a status page or may receive notifications upon predefined events occurring, such as electricity usage exceeding a defined threshold within a month, or current kilowatt usage exceeding a threshold.

Further, a health sensor, such as health sensor 1122, may be integrated in to or as part of the home automation system 1100, and may permit one or more vital characteristics of a particular individual to be acquired and/or monitored, such as a heart rate for instance. In some examples, additionally or alternatively, the health sensor 1122 may contain a button or other type of actuator that a user can press to request assistance. As such, the health sensor 1122 may be mounted to a fixed location, such as bedside, or may be carried by a user, such as on a lanyard. Such a request may trigger a notification to be presented to other users via the display device 1130 and/or the wireless device 1120. Additionally or if the notification is not cleared by another user within a predefined period of time, a notification may be transmitted to emergency first responders to request help. In some examples, a home automation service provider may first try contacting the user, such as via phone, to determine if an emergency is indeed occurring. Such a health sensor 1122 may have additional purposes, such as for notification of another form of emergency, such as a break-in, fire, flood, theft, disaster, etc.

In some examples, the health sensor 1122 may be used as a medical alert pendant that can be worn or otherwise carried by an individual. It may contain a microphone and/or speaker to allow communication with other users and/or emergency first responders. The television receiver 102 and/or overlay device 1128 may be preprogrammed to contact a particular phone number, such as an emergency service provider, relative, caregiver, etc., based on an actuator of the health sensor 1122 being activated by a user. The user may be placed in contact with a person via the phone number and the microphone and/or speaker of the health sensor 1122. Furthermore, camera data may be combined with such alerts in order to give a contacted relative more information regarding the medical situation. For example, the health sensor 1122, when activated in the family room, may generate a command which is linked with security camera footage from the same room. Furthermore, in some examples, the health sensor 1122 may be able to monitor vitals of a user, such as a blood pressure, temperature, heart rate, blood sugar, etc. In some examples, an event, such as a fall or exiting a structure can be detected.

Further, in response to an alert from the health sensor 1122 or some other emergency or noteworthy event, parallel notifications may be sent to multiple users at approximately the same time. As such, multiple people can be made aware of the event at approximately the same time (as opposed to serial notification). Therefore, whoever the event is most pertinent to or notices the notification first can respond. Which users are notified for which type of event may be customized by a user of the television receiver 102. In addition to such parallel notifications being based on data from the health sensor 1122, data from other devices may trigger such parallel notifications. For instance, a mailbox open, a garage door open, an entry/exit door open during wrong time, an unauthorized control of specific lights during vacation period, a water sensor detecting a leak or flow, a temperature of room or equipment is outside of defined range, and/or motion detected at front door are examples of possible events which may trigger parallel notifications.

Additionally, a configuring user may be able to select from a list of users to notify and method of notification to enable such parallel notifications. The configuring user may prioritize which systems and people are notified, and specify that the notification may continue through the list unless acknowledged either electronically or by human interaction. For example, the user could specify that they want to be notified of any light switch operation in their home during their vacation. Notification priority could be: 1) SMS Message; 2) push notification; 3) electronic voice recorder places call to primary number; and 4) electronic voice recorder places call to spouse's number. Other examples are possible, however, it is contemplated that the second notification may never happen if the user replies to the SMS message with an acknowledgment. Or, the second notification would automatically happen if the SMS gateway cannot be contacted.

Further, an intercom, such as the intercom 1126, may be integrated in to or as part of the home automation system 1100, and may permit a user in one location to communicate with a user in another location, who may be using the wireless device 1120, the display device 1130, or some other device, such another television receiver within the structure. The intercom 1126 may be integrated with the security camera 1108 or may use a dedicated microphone/speaker, such as a Bluetooth® microphone. Microphones/speakers of the wireless device 1120, display device 1130, communication device 242, overlay device 1128, etc., may also or alternatively be used. A MOCA® network or other appropriate type of network may be used to provide audio and/or video from the intercom 1126 to the television receiver 102 and/or to other television receivers and/or wireless devices in communication with the television receiver 102.

Further, a light controller, such as light controller 1134, may be integrated in to or as part of the home automation system 1100, and may permit a light to be turned on, off, and/or dimmed by the television receiver 102 or the overlay device 1128, such as based on a user command received from the wireless device 1120 or directly via television receiver 102 or overlay device 1128, etc. The light controller 1134 may control a single light. As such, multiple different ones of the light controller 1134 may be present within a house or residence. In some examples, a physical light switch, that opens and closes a circuit of the light, may be left in the "on" position such that light controller 1134 can be used to control whether the light is on or off. The light controller 1134 may be integrated into a light bulb or a circuit, such as between the light fixture and the power source, to control whether the light is on or off. An end-user, via the television receiver 102 or overlay device 1128, may be permitted to view a status of each instance of the light controller 1134 within a location.

Since the television receiver 102 or overlay device 1128 may communicate using different home automation protocols, different instances of the light controller 1134 within a location may use disparate or different communication protocols, but may all still be controlled by the television receiver 102 or overlay device 1128. In some examples, wireless light switches may be used that communicate with the television receiver 102 or overlay device 1128. Such switches may use a different communication protocol than any particular instance of the light controller 1134. Such a difference may not affect functionality because the television receiver 102 or overlay device 1128 can serve as a hub for multiple disparate communication protocols and perform any necessary translation and/or bridging functions. For example, a tablet computer may transmit a command over a WiFi connection and the television receiver 102 or overlay device 1128 may translate the command into an appropriate Zigbee® or Zwave® command for a wireless light bulb. In some examples, the translation may occur for a group of disparate or different devices. For example, a user may decide to turn off all lights in a room and select a lighting command on a tablet computer, the overlay device 1128 may then identify the lights in the room and output appropriate commands to all devices over different protocols, such as a Zigbee® wireless light bulb and a Zwave® table lamp.

Additionally, it is contemplated that the television receiver 102 may permit timers and/or dimmer settings to be set for lights via the light controller 1134. For instance, lights can be configured to turn on/off at various times during a day according to a schedule and/or events being detected by the home automation system 1100, etc. Here, as well as in all instances of home automation related data as acquired and served to the television receiver 102 and/or overlay device 1128 by particular elements of FIG. 11, each particular instance of the light controller 1134 may be controlled via interaction with particular controls as provided within or by an EPG or like interface, and information or data as acquired by each particular instance of the light controller 1134 may be manipulated, consolidated, etc., as desired, and also made accessible within or by an EPG or like interface in accordance with the principles of the present disclosure.

Further, a thermostat, such as the thermostat 1136, may be integrated in to or as part of the home automation system 1100, and may provide heating/cooling updates to the television receiver 102 and/or overlay device 1128 for display via display device 1130 and/or wireless device 1120. Further, control of thermostat 1136 may be effectuated via the television receiver 102 or overlay device 1128, and zone control within a structure using multiple thermostats may also be possible. Here, as well as in all instances of home automation related data as acquired and served to the television receiver 102 and/or overlay device 1128 by particular elements of FIG. 11, the thermostat 1136 may be controlled via interaction with particular controls as provided within or by an EPG or like interface, and information or data as acquired by the thermostat 1136 may be manipulated, consolidated, etc., as desired.

Further, a leak detection sensor, such as the leak detection sensor 1138, may be integrated in to or as part of the home automation system 1100, and may be used to determine when a water leak as occurred, such as in pipes supplying water-based fixtures with water. The leak detection sensor 1138 may be configured to attach to the exterior of a pipe and listen for a sound of water moving within a pipe. In other examples, sonar, temperature sensors or ion infused water with appropriate sensors may be used to detect moving water. As such, cutting or otherwise modifying plumbing may not be necessary to use or leverage the leak detection sensor 1138. If water movement is detected for greater than a threshold period of time, it may be determined a leak is occurring. The leak detection sensor 1138 may have a component that couples over an existing valve such that the flow of water within one or more pipes can be stopped. For instance, if the leak detection sensor 1138 determines a leak may be occurring, a notification may be provided to a user via the wireless device 1120 and/or display device 1130 by the television receiver 102 and/or overlay device 1128. If a user does not clear the notification, the flow of water may be shut off by the leak detection sensor 1138 after a predefined period of time. A user may also be able to provide input to allow the flow of water to continue or to immediately interrupt the flow of water.

Further, an applicant controller, such as the appliance controller 1140, may be integrated in to or as part of the home automation system 1100, and may permit a status of an appliance to be retrieved and commands to control operation to be sent to an appliance by the television receiver 102 or overlay device 1128. For instance, the appliance controller 1140 may control a washing machine, a dryer, a dishwasher, an oven, a microwave, a refrigerator, a toaster, a coffee maker, a hot tub, or any other form of appliance. The appliance controller 1140 may be connected with a particular appliance or may be integrated as part of the appliance. Additionally, or alternatively, the appliance controller 1140 may enable for acquisition of data or information regarding electricity usage of one or more devices (e.g., other home automation devices or circuits within a home that are monitored) to be determined.

Further, a garage door controller, such as the garage door controller 1142, may be integrated in to or as part of the home automation system 1100, and may permit a status of a garage door to be checked and the door to be opened or closed by a user via the television receiver 102 or overlay device 1128. In some examples, based on a physical location of the wireless device 1120, the garage door may be controlled. For instance, if the wireless device 1120 is a cellular phone and it is detected to have moved a threshold distance away from a house having the garage door controller 1142 installed, a notification may be sent to the wireless device 1120. If no response is received within a threshold period of time, the garage may be automatically shut. If the wireless device 1120 moves within a threshold distance of the garage door controller 1142, the garage may be opened.

Further, a lock controller, such as the lock controller 1144, may be integrated in to or as part of the home automation system 1100, and may permit a door to be locked and unlocked and/or monitored by a user via the television receiver 102 or overlay device 1128. In some examples, the lock controller 1144 may have an integrated door sensor 1112 to determine if the door is open, shut, or partially ajar. Being able to only determine if a door is locked or unlocked may not be overly useful—for instance, a lock may be in a locked position, but if the door is ajar, the lock may not prevent access to the house. Therefore, for security, a user may benefit from knowing both that a door is closed (or open) and locked (or unlocked). To accomplish such notification and control, the lock controller 1144 may have an integrated door sensor 1112 that allows for the lock controller 1144 to lock/unlock a door and provide a status as to whether the door is open or shut. Therefore, a single device may control a lock and determine whether the associated door is shut or open. No mechanical or electrical component may need to be integrated separately into a door or doorframe to provide such functionality. Such a single device may have a single power source that allows for sensing of the lock position, sensing of the door position, and for engagement/disengagement of the lock.

For example, the lock controller 1144 may have an integrated door sensor that includes a reed switch or proximity sensor that detects when the door is in a closed position, with a plate of the lock in proximity to a plate on the door frame of the door. For instance, a plate of the lock may have an integrated magnet or magnetized doorframe plate. When in proximity to the magnet, a reed switch located in the lock controller 1144 may be used to determine that the door is closed; when not in proximity to the magnet, the reed switch located in the lock controller 1144 may be used to determine that the door is at least partially ajar. Rather than using a reed switch, other forms of sensing may also be used, such as a proximity sensor to detect a doorframe. In some examples, the sensor to determine the door is shut may be integrated directly into the deadbolt or other latching mechanism of the lock controller 1144. When the deadbolt is extended, a sensor may be able to determine if the distal end of the deadbolt is properly latched within a door frame based on a proximity sensor or other sensing means.

Further, a home security system, such as the home security system 1106, may be integrated in to or as part of the home automation system 1100. In general, the home security system 1106 may detect motion, when a user has armed/disarmed the home security system 1106, when windows/doors are opened or broken, etc. The television receiver 102 may adjust settings of the home automation devices of FIG. 11 based on home security system 1106 being armed or disarmed. For example, a virtual control and alarm panel may be presented to a user via the display device 1130. The functions of a wall mounted panel alarm can be integrated in the graphical user interface of the TV viewing experience such as a menu system with an underlying tree hierarchical structure. It is contemplated that the virtual control and alarm panel can appear in a full screen or PiP (Picture-in-Picture) with TV content. Alarms and event notification can be in the form of scrolling text overlays, popups, flashing icons, etc.

Additionally, camera video and/or audio, such as from the security camera 1108, can be integrated with DVR content provided by the television receiver 102 with additional search, zoom, time-line capabilities. The camera's video stream can be displayed full screen, PiP with TV content, or as a tiled mosaic to display multiple camera's streams at a same time. In some examples, the display can switch between camera streams at fixed intervals. The television receiver 102 may perform video scaling, adjust frame rate and transcoding on video received from the security camera 1108. In addition, the television receiver 102 may adaptively transcode the camera content to match an Internet connection.

Further, an irrigation controller, such as the irrigation controller 1146, may be integrated in to or as part of the home automation system 1100, and may allow for a status and control of an irrigation system, such as a sprinkler system, to be controlled by a user via the television receiver 102 and/or overlay device 1128. The irrigation controller 1146 may be used in conjunction with the weather sensor 1114 to determine whether and/or for how long (duration) the irrigation controller 1146 should be activated for watering. Further, a user, via the television receiver 102 and/or overlay device 1128, may turn on, turn off, or adjust settings of the irrigation controller 1146.

Further, a doorbell sensor, such as the doorbell sensor 1148, may be integrated in to or as part of the home automation system 1100, and may permit an indication of when a doorbell has been rung to be sent to multiple devices, such as the television receiver 102 and/or the wireless device 1120. In some examples, the doorbell sensor 1148 detecting a doorbell ring may trigger video to be recorded by the security camera 1108 of the area near the doorbell and the video to be stored until deleted by a user, or stored for predefined period of time. Here, as well as in all instances of home automation related data as acquired and served to the television receiver 102 and/or overlay device 1128 by particular elements of FIG. 11, the doorbell sensor 1148 may be controlled via interaction with particular controls as provided within or by an EPG or like interface, and information or data as acquired by the doorbell sensor 1148 may be manipulated, consolidated, etc., as desired, and also made accessible within or by an EPG or like interface in accordance with the principles of the present disclosure.

For example, "selection" of a doorbell by an individual so as to "trigger" the doorbell sensor 1148 may activate or engage the television receiver 102 to generate and output for display by a presentation device, a user interface, display, pop-up, etc., that which may include particular information such as "There is someone at your front door ringing the doorbell" for example. Additional, or alternative, actions such as activating, by the television receiver 102, a security camera to record video and/or audio of the individual at the front door are contemplated as well. Further, similar steps or actions may be taken or implemented by the television receiver 102 for example in response to a signal generated in response to detection of an event, etc., received by the television receiver 102 from any of the elements of FIG. 11.

Additional forms of sensors not illustrated in FIG. 11 may also be incorporated as part of the home automation system 1100. For instance, a mailbox sensor may be attached to a mailbox to determine when mail is present and/or has been picked up. The ability to control one or more showers, baths, and/or faucets from the television receiver 102 and/or the wireless device 1120 may also be possible. Pool and/or hot tub monitors may be incorporated into the home automation system 1100. Such sensors may detect whether or not a pump is running, water temperature, pH level, a splash/ whether something has fallen in, etc. Further, various characteristics of the pool and/or hot tub may be controlled via the home automation system. In some examples, a vehicle "dashcam" may upload or otherwise make video/audio available to the television receiver 102 when within range of a particular residence. For instance, when a vehicle has been parked within range of a local wireless network with which the television receiver 102 is connected, video and/or audio may be transmitted from the dashcam to the television receiver 102 for storage and/or uploading to a remote server.

As may be understood from the foregoing, various arrangements for monitoring and control applications are presented. In particular, a television receiver may be configured and/or arranged to monitor sensor reading and or provide signals to control units for monitoring and home automation applications, such as fire monitoring application, pet monitoring applications, baby monitoring applications, and many other applications as well such as, for example, occupant monitoring and simulation applications, and "best exit" application wherein the television receiver 102 may output for presentation by a display device a map and/or escape instructions in event of a fire or other alarm condition, or virtually any other condition as derived via the smart-home sensor network as shown in FIG. 11.

For instance, in one example implementation, a method for providing a user notification of a fire alarm using a television receiver may include or comprise receiving, at the television receiver, sensor readings from sensors, analyzing, using the television receiver, the sensor readings to determine an incident condition causing the fire alarm, wherein the incident condition includes location and the severity of incident, determining, using the television receiver, an active user profile, based at least in part on the active user profile, generating, using the television receiver, the user notification to be presented to a user associated with the active user profile, wherein the active user profile is determined based on a type of programming watched using the television receiver. Advantageously, such an example implementation may enable a tailored or customized notification to be generated and presented to inform a particular user details associated with the fire alarm so that the user may take measures to address the situation or at least exit a premises quickly and without anxiety, etc. Other benefits and/or advantages are possible as well.

For instance, in some examples, the method may further include or comprise determining an age of an active user of the television receiver, wherein the user notifications are tailored for the age of the active user. In some example, active users of less than or equal to 10 years old are presented with the user notification related to an evacuation route. In some examples, additional user notifications may be approved or authorized for output after or upon entry of a parental code. The method may further include or comprise determining the active user profile based on a history of type of programming watched using the television receiver. In some examples, the user notification includes an evacuation route, and wherein the evacuation route is selected to avoid the location of the incident. In some examples, the sensors include a smoke sensor and/or any of the sensors such as that shown and described above in connection with FIG. 11. Other implementations are possible.

For instance, in one example implementation, a method for monitoring activity of a child using a television receiver may include or comprise determining a location of a position indicator relative to sensors in a home, determining a type of position indicator near sensors in the home monitoring sensor readings to determine a child location in the home, analyzing a relative location of the child in the home with respect to the location of the position indicator based at least in part on the relative location of the child with respect to the position indicator and the type of the position indicator, generating an alert signal for the child, at least in part on the relative location of the child with respect to the position indicator and the type of the position indicator, generating a user notification to alert a user of the position of the child relative to the location of the position indicator. Advantageously, such an example implementation may enable the monitoring and/or tracking of a child or minor within the home. Other benefits and/or advantages are possible as well.

For instance, in some examples, the position indicator may indicate an unsafe or safe area. In some examples, the alert signal may comprise a recorded voice of a parent of the child. In some examples, the alert signal may comprise tuning the television receiver to children's programing and displaying the programming on a television near the child. In some examples, the alert signal comprises playback of a recorded message of the user. Other implementations are possible.

For instance, in one example implementation, a method for monitoring a pet using a television receiver may include or comprise receiving a training sensor reading from one or more sensors, the training sensor reading indicative of a pet's location in a home, receiving an indication to capture and save the training sensor reading for the location, monitoring additional sensor readings, comparing the additional sensor readings to the saved training sensor reading, and generating a user indication if the additional sensor readings are consistent with the training sensor reading and wherein the user indication is associated with the location of the pet. Advantageously, such an example implementation may enable the monitoring and/or tracking of a pet or other object within the home. Other benefits and/or advantages are possible as well.

For instance, in some examples, the first training sensor reading is captured over a time interval. In some examples, the method may further include or comprise receiving a second training sensor reading, the second training sensor reading indicative of a pet's activity in a home. In some examples, the second training sensor reading is captured over a time interval. In some examples, the time interval corresponds to a time period of the pet's activity. In some examples, the one or more sensors includes a sensor attached to the pet. In some examples, the user indication is configured to be displayed on a television in communication with the television receiver and wherein the user indication includes a map of the home. Other implementations are possible.

For instance, in one example implementation, a method for monitoring and simulating the presence of an occupant in a home using a television receiver may include or comprise monitoring and recording sensor readings of a home, the sensor readings indicative of the occupancy of the home, determining occupancy and activity trends within the home, simulating the occupancy of the home at a time when no occupants are present in the home, the simulating includes activating lights in a pattern consistent with the activity trends, and injecting random variations into the pattern of activating lights. Advantageously, such an example implementation may enable monitoring and simulating presence of an occupant in a home. Other benefits and/or advantages are possible as well.

For instance, in some examples, the simulating includes activating television programming. In some examples, the method may further include or comprise receiving supplemental configuration data from the service provider, the supplemental configuration data includes information related to crime statistics and activation pattern suggestions based on the crime statistics. In some examples, the method may further include or comprise injecting changes into the pattern of activating lights and television programming based at least in part on the supplemental configuration data. In some examples, the simulating includes activating appliances. In some examples, the supplemental configuration data includes programming tuning suggestions based on the time of the year. In some examples, the supplemental configuration data includes suggestions for which areas of the home the lighting should be activated. Other implementations are possible.

For instance, in one example implementation, a method may include or comprise receiving, by a television receiver incorporated within a home automation network, data from at least one component of the home automation network. In general, the at least one component may include or comprise any particular one of the systems, elements, components, devices, etc., discussed above in connection with one or more of FIGS. 1-4, FIG. 6, and FIG. 11. Additionally, in this example, the television receiver may be one or both of wired and wirelessly coupled to the at least one component so as to facilitate communication and/or transfer of data between the television receiver and the at least one component. The method may further include or comprise analyzing, by the television receiver, the data to identify a particular condition that when met is cause for the television receiver to output a particular notification to at least one computing device for presentation thereby, to provide notice of the particular condition, and outputting, by the television receiver, the particular notification to the at least one computing device for presentation thereby in response to identification of the particular condition. Here, it is contemplated that type of one or both of the particular condition and the particular notification may be a function of type of the at least one component, and further that the at least one computing device may take the form of any particular type of computing system device, examples of which are discussed in further detail below in connection with FIG. 11.

As an example, the at least one component may include or comprise of a hazard detector such as a smoke and/or carbon monoxide detector. In this example, the particular condition may correspond to "smoke detected" and the particular notification may include or comprise of an audio and/or visual cue of "smoke has been detected in the hallway, exit the residence immediately," followed by a series or sequence of "beeps" or "chirps" to indicate the need to be cautious or on alert, and possible even severity of the "smoke event" such as "very high" or "very dangerous" for example. It is contemplated that many other examples are possible as well, and the same may be tailored and/or customized as needed and/or desired, and still further may be implementation-specific due to type of home automation system, security system, and so on.

To further elaborate, the method may include or comprise receiving data from a particular hazard detector of the home automation network, and outputting the particular notification to the at least one computing device for presentation thereby in response to identification of an alarm condition detected by the particular hazard detector. As mentioned, the particular hazard detector may include or comprise of a smoke and/or carbon monoxide detector. In this example, the alarm condition may correspond to "smoke at concentration 'X' ppm detected for 2 consecutive minutes." Still many other examples, and implementations, are possible.

For instance, in some examples, the method may include or comprise receiving data from a particular hazard detector of the home automation network, and outputting, by the television receiver to the at least one computing device, the particular notification that includes a particular message as a guide to exit a residence associated with the home automation network. Here, it is contemplated that the "guide" may include a visual cue such as a "map" of the residence, along with an "arrow" that may "point" an individual towards a closest unobstructed or "safe" exit, such as through a hallway, living room, and to a front door for example.

Additionally, or alternatively, it is contemplated that the "guide" may include an audio cue such as a "voice" command that may "direct" an individual towards a closest unobstructed or "safe" exit, such as "walk calmly through the hallway, living room, and then exit through the front door" for example. In instances where the at least one computing device is a handheld device, such as a smartphone for example, GPS, triangulation, possible in tandem with a pre-stored "map" of the residence, may be leveraged to identify or determine a current or instance precise location of the individual within the residence (or more precisely the computing device) so that the computing device may better "guide" the individual to the exit. For example, an audio cue such as "you are currently in the master bedroom, walk out the master bedroom door and turn left, then walk calmly through the hallway, take a right into the living room, and then walk straight until you reach the front door, and then exit through the front door" may be output by the computing device for example.

Additionally, or alternatively, it is contemplated that the "guide" may include a tactile audio cue such as a "vibratory" command that may "direct" an individual towards a closest unobstructed or "safe" exit. In instances where the at least one computing device is a handheld device, such as a smartphone for example, GPS, triangulation, possible in tandem with a pre-stored "map" of the residence, may be leveraged to identify or determine a current or instance precise location of the individual within the residence (or more precisely the computing device) so that the computing device may better "guide" the individual to the exit. For example, consider the above-mentioned audio cue "you are currently in the master bedroom, walk out the master bedroom door and turn left, then walk calmly through the hallway, take a right into the living room, and then walk straight until you reach the front door, and then exit through the front door." Here, it is contemplated that the computing device may output a vibratory sequence "buzz (pause) buzz (pause) buzz" along with an audio "Warning, you are walking the wrong way," if for example the individual walks out the master bedroom door, turns "right," and then starts to walk down the hallway—in contrary to the original directions. Still many other examples, and implementations, are possible.

For instance, in some examples, the method may include or comprise receiving data from a baby monitoring device of the home automation network, and outputting the particular notification to the at least one computing device for presentation thereby in response to identification of an alarm condition detected by the baby monitoring device. Here, it is contemplated that the baby monitoring device may include or comprise a microphone, a video camera, motion sensor, and etc., and when the microphone (for example) detects a high pitched "noise" akin to "crying" for more than 3 straight or consecutive minutes, the baby monitoring device may determine that an "alarm condition" has been met, and then a command signal may be sent to the computing device so that the same may output one or more of an audio, visual, and tactile cue to indicate "baby in distress" for example. In general, the parameter "3 straight or consecutive minutes" may be pre-defined and/or user-configurable so that that the system is customizable as needed or desired. It is contemplated that such a "configuration" or "customization" principle may generally apply to each and every feature or aspect of the present disclosure. Still many other examples, and implementations, are possible.

For instance, in some examples, the method may include or comprise receiving data from a pet monitoring device of the home automation network, and outputting the particular notification to the at least one computing device for presentation thereby in response to identification of an alarm condition detected by the pet monitoring device. Here, it is contemplated that the pet monitoring device may in one example be coupled to a pet and may include or comprise a microphone, a video camera, motion sensor, and etc., and when the microphone (for example) detects a sharp "noise" akin to "barking" or "whining" for more than 3 straight or consecutive minutes, the pet monitoring device may determine that an "alarm condition" has been met, e.g., the pet is at the front door waiting to go outside, and then a command signal may be sent to the computing device so that the same may output one or more of an audio, visual, and tactile cue to indicate "puppy in distress" for example. Still many other examples, and implementations, are possible.

For instance, in some examples, the method may include or comprise receiving data from at least one motion sensor of the home automation network, and controlling one or more other components of the home automation network to exhibit a particular status based upon a particular reading of the at least one motion sensor. In this example, it is contemplated that one or more motion sensors may be incorporated into one or more of the previously detailed home automation devices or as a stand-alone device. Such motion sensors may be used to determine if a structure is occupied. Such information may be used in conjunction with a determined location of one or more wireless devices. If some or all users are not present in the structure, home automation settings may be adjusted, such as by lowering a temperature of thermostat, shutting off lights via light controller, and determining if one or more doors are closed by door sensor. In some example, a user-defined script may be run when it is determined that no users or other persons are present within the structure, e.g., turn "on" lamps and TV from 7 pm-10:30 pm M-Th, and from 6:30 PM to 2 AM Fri-Sat, wherein a "randomness" may be injected so as to give the appearance that someone is "home," as a deterrent. Still many other examples, and implementations, are possible as may be understood upon inspection of the present disclosure in its entirety and in context.

For instance, in some examples, a method may include or comprise monitoring, by a computing device communicatively coupled to a television receiver, sensor readings acquired by a hazard detector installed at a residence and communicatively coupled to the computing device; analyzing, by the computing device, particular sensor readings acquired by the hazard detector to identify a particular hazard condition upon occurrence thereof; and outputting, by the computing device to a presentation device for output thereby, a particular notification that provides an indication of the particular hazard condition upon occurrence thereof and that is selected based upon type of programming content provided to the presentation device for output thereby. The computing device in such an implementation may in some examples correspond to the overlay device 1128 of FIG. 11, whereby the overlay device 1128 and the PTR 210 as shown in FIG. 11 may in some examples be referred to as a home automation computing system or device. Additionally, the type of programming in such an implementation may refer to for example one or more of genre, motion picture rating, and etc., that which describes at least one particular aspect of the programming. In other examples, a particular standard such as a "broadcasting watershed," for example, and/or a particular broadcast channel type such as "Adult Pay-Per-View," and etc., may influence or be leveraged in order to enable the selection of the particular notification. Still many other examples, and implementations, are possible.

For instance, in some examples, the method may include or comprise identifying presence of smoke by analyzing sensor readings acquired by the hazard detector, and outputting the particular notification that which provides an indication of presence of smoke or fire within the residence. In this example, the hazard detector may thus include or comprise a smoke and/or fire detector, and the particular notification may include or comprise any one of an audio, visual, and or tactile cue such as, for example, and audible "alert, fire has been detected" and/or a graphic that states "alert, fire has been detected" and/or a vibratory sequence "buzz-buzz-buzz-stop-buzz-buzz-buzz" and etc. With the latter, Morse Code may in some instances be leveraged so as to convey the message "alert, fire has been detected." It is contemplated that the hazard detector itself may include or comprise any of a number of different features or functionality as needed or desired. Still many other examples, and implementations, are possible.

For instance, in some examples, the method may include or comprise identifying presence of carbon monoxide by analyzing sensor readings acquired by the hazard detector, and outputting the particular notification that which provides an indication of presence of carbon monoxide within the residence. In this example, the hazard detector may thus include or comprise a carbon monoxide detector, and the particular notification may include or comprise any one of an audio, visual, and or tactile cue such as, for example, and audible "alert, carbon monoxide has been detected" and/or a graphic that states "alert, carbon monoxide has been detected" and/or a vibratory sequence "buzz-buzz-stop-buzz-buzz" and etc. With the latter, Morse Code may in some instances be leveraged so as to convey the message "alert, carbon monoxide has been detected." Still many other examples, and implementations, are possible.

For instance, in some examples, the method may include or comprise analyzing sensor readings acquired by the hazard detector over a predetermined time period to identify the particular hazard condition upon occurrence thereof, and identifying presence of the particular hazard condition when hazard levels are detected for a time period greater than or equal to the predetermined time period. It is contemplated that such an implementation or scenario may take many different forms. For example, the hazard detector may detect particular hazard levels that are maintained for a predetermined and configurable period of time, such as "$CO_2$ at X concentration $>=$Y consecutive minutes" for example. Still many other examples, and implementations, are possible.

For instance, in some examples, the method may include or comprise outputting the particular notification that which provides an indication of location of the hazard detector within the residence and a description of the particular hazard condition. An example of such a particular notification may include "alert, fire has been detected by the hazard detector in the hallway, excessive heat and smoke have been detected." Still many other examples, and implementations, are possible.

For instance, in some examples, the method may include or comprise selecting the particular notification based upon type of programming content provided to the presentation device for output thereby so that the particular notification includes age-specific content selected from adult-orientated warning content and minor-orientated warning content. Here, adult-orientated warning content may include or comprise, for example, "alert, fire has been detected by the hazard detector in the hallway, excessive heat and smoke have been detected," whereby such a notification may be output so as to be perceived by an "adult" if for example, the "10 PM News" is currently being output for viewing, etc. It will be appreciated that other examples are possible. Further, minor-orientated warning content may include or comprise, for example, "lie on the floor and do not move until someone comes to get you" possibly as a recording of the voice of a parent, whereby such a notification may be output so as to be perceived by a "minor" if for example, "Dino Dan" is currently being output for viewing, etc. Still many other examples, and implementations, are possible.

For instance, in some examples, the method may include or comprise selecting the particular notification based upon type of programming content provided to the presentation device over a predetermined time period for output thereby. In this example, the computing device and/or television receiver may access historical usage information to figure out who might be watching TV around the time of the hazard condition. For example, the particular notification may include adult-orientated warning content upon a determination that a couple episodes of "Dexter" was recently watched. As another example, the particular notification may include minor-orientated warning content upon a determination that a couple of episodes of "Dino Dan" was recently watched. Still many other examples, and implementations, are possible.

For instance, in some examples, the method may include or comprise outputting the particular notification that which provides a suggested evacuation route from the residence to enable an individual to avoid the particular hazard condition. For example, in an adult-orientated warning content scenario, the particular notification may include or comprise, for example, "alert, fire has been detected by the hazard detector in the living room, immediately exit the residence via the back door. Still many other examples, and implementations, are possible.

For instance, in some examples, a method may include or comprise detecting, by a computing device communicatively coupled to a television receiver, a command to activate a plurality of sensors each positioned at a particular location of a residence and communicatively coupled to the computing device, to acquire data to determine location of a pet or animal at the residence, analyzing, by the computing device, particular data as acquired by each of the plurality of sensors to determine location of the pet or animal at the residence, and outputting, by the computing device for presentation by another computing device, at least one notification that provides an indication of location of the pet or animal at the residence. The computing device in such an implementation may in some examples correspond to the overlay device 1128 of FIG. 11, whereby the overlay device 1128 and the PTR 210 as shown in FIG. 11 may in some examples be referred to as a home automation computing system or device. Additionally, the another computing device may correspond to a TV or smartphone, for example, at the least one notification that provides an indication of location of the pet or animal at the residence may include a textual "your dog is in the upstairs bedroom" for example. Still many other examples, and implementations, are possible.

For instance, in some examples, the method may include or comprise receiving, by the computing device, at least one of audio data, video data, motion data, and thermal imaging data to determine location of the pet or animal within the residence. Accordingly, it is contemplated that the system may leverage multiple different types of sensor data to find out where the pet is within the residence, such as any of one or more of the elements and/or components as shown at in FIG. 11, above. Still many other examples, and implementations, are possible.

For instance, in some examples, the method may include or comprise determining location of the pet or animal at the residence based upon particular data acquired by multiple sensors of the plurality of sensors from a tag or beacon coupled to the pet or animal. Accordingly, it is contemplated that the system may leverage a tag or beacon or collar, etc., each of which may be configured and/or arranged to include particular electronics so that system may derive the location of the pet or animal at the residence. Still many other examples, and implementations, are possible.

For instance, in some examples, the method may include or comprise receiving a command to activate a food and/or water dispenser installed at the residence and communicatively coupled to the computing device, and activate the food and/or water dispenser to dispense food and/or water for the pet or animal. It is contemplated that the such a dispenser(s) may be activated remotely (e.g., via smartphone) or from a system (e.g., via television receiver remote control) so that a pet or animal may receive sustenance as needed and/or desired, and at any time. Still many other examples, and implementations, are possible.

For instance, in some examples, the method may include or comprise receiving a command to output, for presentation by the another computing device, a usage indicator of at least one appliance or component of a home automation system installed to the residence, and outputting, for presentation by the another computing device and based on the command, the usage indicator of at least one appliance or component of the home automation system installed to the residence. Such an implementation may be beneficial and/or advantageous in many respects. For example, a pet owner might use their mobile phone or TV remote control to determine if a "doggy door" has recently been used, and etc. Still many other examples, and implementations, are possible.

For instance, in some examples, the method may include or comprise receiving a command to control at least one appliance or component of a home automation system installed to the residence; and controlling, based on the command, status of at least one appliance or component of the home automation system installed to the residence. Such an implementation may be beneficial and/or advantageous in many respects. For example, a pet owner might want to turn on a light, etc., for their pet if away from home for extended period, and etc. Still many other examples, and implementations, are possible.

For instance, in some examples, the method may include or comprise outputting, by the computing device for presentation by the another computing device, at least one notification that provides an indication of location of the pet or animal at the residence over a particular time period. Such an implementation may be beneficial and/or advantageous in many respects. For example, such an implementation may enable a pet owner to monitor pet activity over time. Still many other examples, and implementations, are possible.

For instance, in some examples, the method may include or comprise generating, by the computing device, the command to activate the plurality of sensors based upon a user-defined timing schedule. Such an implementation may be beneficial and/or advantageous in many respects. For example, such an implementation may enable a pet owner to set a time to periodically push a notice down that lets them know what the status of their pet is. Still many other examples, and implementations, are possible.

For instance, in some examples, a method may include or comprise detecting, by a computing device communicatively coupled to a television receiver, a command to activate a plurality of sensors each positioned at a particular location of a residence and communicatively coupled to the home automation system, to acquire data to determine location of an individual at the residence, analyzing, by the computing device, particular data as acquired by each of the plurality of sensors to determine location of the individual at the residence, and outputting, by the computing device for presentation by another computing device, at least one notification that provides an indication of location of the individual at the residence. The computing device in such an implementation may in some examples correspond to the overlay device 1128 of FIG. 11, whereby the overlay device 1128 and the PTR 210 as shown in FIG. 11 may in some examples be referred to as a home automation computing system or device. Additionally, the another computing device may correspond to a TV or smartphone, for example, at the least one notification that provides an indication of location of the pet or animal at the residence may include a textual "your child is in the upstairs bedroom" for example. Still many other examples, and implementations, are possible.

For instance, in some examples, the method may include or comprise playing-back at least one of a pre-recorded audio clip and a pre-recorded video clip for output by another particular computing device. Such an implementation may be beneficial and/or advantageous in many respects. For example, it is contemplated that a parent could record an audio and/or video clip that could be then played-back to soothe to their infant or child. Still many other examples, and implementations, are possible.

For instance, in some examples, the method may include or comprise outputting a command to the television receiver for the television receiver to tune to particular television programming for output by another particular computing device. Such an implementation may be beneficial and/or advantageous in many respects. For example, it is contemplated that children's programming may be output to a TV to soothe to an infant or child. Still many other examples, and implementations, are possible.

For instance, in some examples, the method may include or comprise receiving a command to activate a speaker system installed at the residence and coupled to the computing device, and transferring a particular message for output by the speaker system to convey the particular message to the at least one individual. Such an implementation may be beneficial and/or advantageous in many respects. For example, it is contemplated that a parent could use their mobile phone to verbally soothe their infant or child via an intercom system, or TV, etc. Still many other examples, and implementations, are possible.

For instance, in some examples, a method may include or comprise monitoring, by a computing device communicatively coupled to a television receiver, data as acquired by a plurality of sensors each positioned at a particular location of a residence and communicatively coupled to the computing device, extrapolating, by the computing device, occupancy and activity trends based on the data as acquired by the plurality of sensors, and simulating, in response to a particular command, occupancy of the residence by activating lights in a pattern consistent with the occupancy and activity trends and injecting random variations into the pattern of activating lights. The computing device in such an implementation may in some examples correspond to the overlay device 1128 of FIG. 11, whereby the overlay device 1128 and the PTR 210 as shown in FIG. 11 may in some examples be referred to as a home automation computing system or device. Still many other examples, and implementations, are possible.

For instance, in some examples, the method may include or comprise simulating occupancy of the residence by activating and deactivating at least one television in a pattern consistent with the occupancy and activity trends. In some examples, the method may include or comprise simulating occupancy of the residence by adjusting at least one drape or blind in a pattern consistent with the occupancy and activity trends. In some examples, the method may include or comprise simulating occupancy of the residence by outputting at least one audio recording via at least one output device at a random time. Advantageously, such features or aspects of the present disclosure may serve as a break-in deterrent, for example, since such activities are typically considered an activity that is performed when a residence is occupied. Still many other examples, and implementations, are possible.

For instance, in some examples, the method may include or comprise controlling the injecting of random variations based upon an instant particular time of day. In some examples, the method may include or comprise controlling the injecting of random variations based upon an instant particular time of year. In some examples, the method may include or comprise controlling the injecting of random variations based upon a signal received by the computing device from a particular system over a network connection, wherein the signal is indicative of particular criminal activity in a vicinity of the residence. Advantageously, controlling the injecting of random variations in an intelligent manner may even further as break-in deterrent, since patterns in simulation may be tailored to a particular climate, neighborhood, and etc. Still many other examples, and implementations, are possible.

Figure 12:
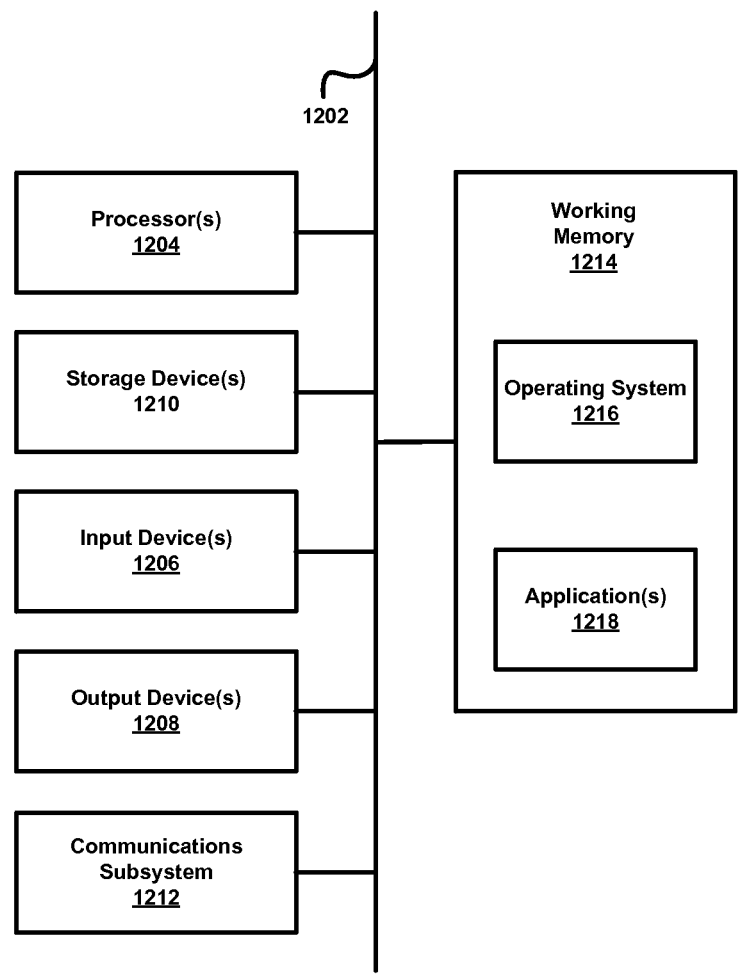
FIG. 12 shows an example computer system or device.

FIG. 12 shows an example computer system or device 1200 in accordance with the disclosure. An example of a computer system or device includes a particular "smart" home automation-related sensor or device or system or controller or monitor or detector or the like, an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 1200, such as any of the respective elements or components of at least FIG. 1, FIG. 2, FIG. 4, FIG. 6, and FIG. 11. In this manner, any of one or more of the respective elements of those figures may be configured and/or arranged, wholly or at least partially, to implement one or more of the various features or aspects of the present disclosure. Still further, any of one or more of the respective elements of at least FIG. 11 may be configured to perform and/or include instructions that, when executed, instantiate and implement functionality of the HMAC module 1101.

The computer device 1200 is shown comprising hardware elements that may be electrically coupled via a bus 1202 (or may otherwise be in communication, as appropriate). The hardware elements may include a processing unit with one or more processors 1204, including without limitation one or more general-purpose processors and/or one or more special-purpose processors (such as digital signal processing chips, graphics acceleration processors, and/or the like); one or more input devices 1206, which may include without limitation a remote control, a mouse, a keyboard, and/or the like; and one or more output devices 1208, which may include without limitation a presentation device (e.g., television), a printer, and/or the like.

The computer system 1200 may further include (and/or be in communication with) one or more non-transitory storage devices 1210, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1200 might also include a communications subsystem 1212, which may include without limitation a modem, a network card (wireless and/or wired), an infrared communication device, a wireless communication device and/or a chipset such as a Bluetooth™ device, 1202.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 1212 may permit data to be exchanged with a network (such as the network described below, to name one example), other computer systems, and/or any other devices described herein. In many examples, the computer system 1200 will further comprise a working memory 1214, which may include a random access memory and/or a read-only memory device, as described above.

The computer device 1200 also may comprise software elements, shown as being currently located within the working memory 1214, including an operating system 1216, device drivers, executable libraries, and/or other code, such as one or more application programs 1218, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1210 described above. In some cases, the storage medium might be incorporated within a computer system, such as computer system 1200. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 1200) to perform methods in accordance with various examples of the disclosure. According to a set of examples, some or all of the procedures of such methods are performed by the computer system 1200 in response to processor 1204 executing one or more sequences of one or more instructions (which might be incorporated into the operating system 1216 and/or other code, such as an application program 1218) contained in the working memory 1214. Such instructions may be read into the working memory 1214 from another computer-readable medium, such as one or more of the storage device(s) 1210. Merely by way of example, execution of the sequences of instructions contained in the working memory 1214 may cause the processor(s) 1204 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 1200, various computer-readable media might be involved in providing instructions/code to processor(s) 1204 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1210. Volatile media may include, without limitation, dynamic memory, such as the working memory 1214.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 1204 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1212 (and/or components thereof) generally will receive signals, and the bus 1202 then might carry the signals (and/or the data, instructions, etc. carried by the signals) to the working memory 1214, from which the processor(s) 1204 retrieves and executes the instructions. The instructions received by the working memory 1214 may optionally be stored on a non-transitory storage device 1210 either before or after execution by the processor(s) 1204. It should further be understood that the components of computer device 1200 can be distributed across a network. For example, some processing may be performed in one location using a first processor while other processing may be performed by another processor remote from the first processor. Other components of computer system 1200 may be similarly distributed. As such, computer device 1200 may be interpreted as a distributed computing system that performs processing in multiple locations. In some instances, computer system 1200 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    detecting, by a computing device, a command to activate a plurality of sensors each positioned at a particular location of a residence and communicatively coupled to the computing device, to acquire data to determine a location of a pet or animal at the residence;
    analyzing, by the computing device, particular data as acquired by each of the plurality of sensors to determine the location of the pet or animal at the residence;
    causing, by the computer device, actuation of a lock of a pet door based on the determined location of the pet or animal at the residence in relation to the pet door;
    analyzing, by the computing device, data received from a sensor of the plurality of sensors that determines a direction of travel of the pet door for use in determining the location of the pet or animal;
    determining a distance away from the residence that the pet or animal has moved using the location of the pet or animal;
    determining that the pet or animal has moved beyond a boundary distance away from the residence by comparing the location of the pet or animal with a threshold distance, wherein the threshold distance includes a maximum desired distance away from the residence as desired by a user; and
    outputting, by the computing device for presentation by another computing device, at least one notification that provides an indication of location of the pet or animal is beyond the maximum desired distance.

2. The method of claim 1, further comprising:
    receiving, by the computing device via a television receiver or the another computing device, the command to activate the plurality of sensors to determine location of the pet or animal at the residence.

3. The method of claim 1, further comprising:
    receiving, by the computing device, at least one of audio data, video data, motion data, and thermal imaging data to determine location of the pet or animal within the residence.

4. The method of claim 1, further comprising:
    determining location of the pet or animal at the residence based upon particular data acquired by multiple sensors of the plurality of sensors from a tag or beacon coupled to the pet or animal.

5. The method of claim 1, further comprising:
    receiving a command to activate a food dispenser installed at the residence and communicatively coupled to the computing device; and
    activating the food dispenser to dispense food for the pet or animal.

6. The method of claim 1, further comprising:
    receiving a command to activate a water dispenser installed at the residence and communicatively coupled to the computing device; and
    activating the water dispenser to dispense water for the pet or animal.

7. The method of claim 1, further comprising:
    receiving a command to output, for presentation by the another computing device, a usage indicator of at least one appliance or component of a home automation system installed to the residence; and
    outputting, for presentation by the another computing device and based on the command, the usage indicator of at least one appliance or component of the home automation system installed to the residence.

8. The method of claim 1, further comprising:
    receiving a command to control at least one appliance or component of a home automation system installed to the residence; and
    controlling, based on the command, status of at least one appliance or component of the home automation system installed to the residence.

9. The method of claim 1, further comprising:
    outputting, by the computing device for presentation by the another computing device, at least one notification that provides an indication of location of the pet or animal at the residence over a particular time period.

10. The method of claim 1, further comprising:
    generating, by the computing device, the command to activate the plurality of sensors based upon a user-defined timing schedule.

11. The method of claim 1, further comprising:
    receiving a training sensor reading indicative of a particular location at the residence;
    receiving an indication to capture and save the training sensor reading for the particular location;
    monitoring additional sensor readings;
    comparing the additional sensor readings to the saved training sensor reading; and
    generating a user indication when the additional sensor readings are consistent with the training sensor reading and wherein the user indication is associated with location of the pet or animal at the residence.

12. The method of claim 1, further comprising:
    receiving vital statistic information about the pet or animal based upon readings taken by at least one vitals acquisition sensor coupled to the pet or animal; and
    outputting the at least one notification that provides the indication of location of the pet or animal at the residence and that also provides a summary of the vital statistic information.

13. A television receiver, comprising:
    one or more processors; and
    a memory communicatively coupled with and readable by the one or more processors and having stored therein processor-readable instructions that, when executed by the one or more processors, cause the one or more processors to:
        detect a command to activate a plurality of sensors each positioned at a particular location of a residence and communicatively coupled to the television receiver, to acquire data to determine a location of a pet or animal at the residence;
        analyze particular data as acquired by each of the plurality of sensors to determine the location of the pet or animal at the residence;
        cause actuation of a lock of a pet door based on the determined location of the pet or animal at the residence in relation to the pet door;
        analyze data received from a sensor of the plurality of sensors that determines a direction of travel of the pet door for use in determining the location of the pet or animal;
        determine a distance away from the residence that the pet or animal has moved using the location of the pet or animal;
        determine that the pet or animal has moved beyond a boundary distance away from the residence by comparing the location of the pet or animal with a threshold distance, wherein the threshold distance includes a maximum desired distance away from the residence as desired by a user of the television receiver; and output, for presentation by a computing device, at least one notification that provides an indication of location of the pet or animal is beyond the maximum desired distance.

14. The television receiver of claim 13, wherein the memory having stored therein processor-readable instructions which, when executed by the one or more processors, cause the one or more processors to:
   determine location of the pet or animal at the residence based upon particular data acquired by multiple sensors of the plurality of sensors from a tag or beacon coupled to the pet or animal.

15. The television receiver of claim 13, wherein the memory having stored therein processor-readable instructions which, when executed by the one or more processors, cause the one or more processors to:
   receive a command to activate a food dispenser installed at the residence and communicatively coupled to the television receiver; and
   activate the food dispenser to dispense food for the pet or animal.

16. The television receiver of claim 13, wherein the memory having stored therein processor-readable instructions which, when executed by the one or more processors, cause the one or more processors to:
   receive a command to activate a water dispenser installed at the residence and communicatively coupled to the television receiver; and
   activate the water dispenser to dispense water for the pet or animal.

17. The television receiver of claim 13, wherein the memory having stored therein processor-readable instructions which, when executed by the one or more processors, cause the one or more processors to:
   receive a command to control at least one appliance or component of a home automation system installed to the residence; and
   control, based on the command, status of at least one appliance or component of the home automation system installed to the residence.

18. The television receiver of claim 13, wherein the memory having stored therein processor-readable instructions which, when executed by the one or more processors, cause the one or more processors to:
   generate the command to activate the plurality of sensors based upon a user-defined timing schedule.

19. The television receiver of claim 13, wherein the memory having stored therein processor-readable instructions which, when executed by the one or more processors, further cause the one or more processors to:
   receive a training sensor reading indicative of a particular location at the residence;
   receive an indication to capture and save the training sensor reading for the particular location;
   monitor additional sensor readings;
   compare the additional sensor readings to the saved training sensor reading; and
   generate a user indication when the additional sensor readings are consistent with the training sensor reading and wherein the user indication is associated with location of the pet or animal at the residence.

20. A computer-implemented method, comprising:
   detecting, by a home automation system, a command to activate a plurality of sensors each positioned at a particular location of a residence and communicatively coupled to the home automation system, to acquire data to determine a location of a pet or animal at the residence;
   analyzing, by the home automation system, particular data as acquired by each of the plurality of sensors to determine the location of the pet or animal at the residence;
   causing, by the home automation system, actuation of a lock of a pet door based on the determined location of the pet or animal at the residence in relation to the pet door;
   analyzing data received from a sensor of the plurality of sensors that determines a direction of travel of the pet door for use in determining the location of the pet or animal;
   determining a distance away from the residence that the pet or animal has moved using the location of the pet or animal;
   determining that the pet or animal has moved beyond a boundary distance away from the residence by comparing the location of the pet or animal with a threshold distance, wherein the threshold distance includes a maximum desired distance away from the residence as desired by a user; and
   outputting, by the home automation system for presentation by a computing device, at least one notification that provides an indication of location of the pet or animal is beyond the maximum desired distance.

* * * * *